United States Patent
Fike, III et al.

(10) Patent No.: US 9,323,041 B2
(45) Date of Patent: Apr. 26, 2016

(54) ELECTROMECHANICAL SYSTEMS DISPLAY APPARATUS INCORPORATING CHARGE DISSIPATION SURFACES

(71) Applicant: Pixtronix, Inc., San Diego, CA (US)

(72) Inventors: Eugene E. Fike, III, Amesbury, MA (US); Cait Ni Chleirigh, Arlington, MA (US); Susan Oakley, Oxford, MA (US); Jignesh Gandhi, Burlington, MA (US)

(73) Assignee: Pixtronix, Inc., San Diego, CA (US)

( * ) Notice: Subject to any disclaimer, the term of this patent is extended or adjusted under 35 U.S.C. 154(b) by 226 days.

(21) Appl. No.: 13/677,044

(22) Filed: Nov. 14, 2012

(65) Prior Publication Data

US 2013/0135193 A1    May 30, 2013

Related U.S. Application Data

(60) Provisional application No. 61/565,159, filed on Nov. 30, 2011.

(51) Int. Cl.
| | |
|---|---|
| *G09G 5/00* | (2006.01) |
| *G02B 26/00* | (2006.01) |
| *G06T 1/20* | (2006.01) |
| *G09G 5/36* | (2006.01) |

(Continued)

(52) U.S. Cl.
CPC .............. *G02B 26/00* (2013.01); *G02B 26/005* (2013.01); *G02B 26/02* (2013.01); *G06F 3/00* (2013.01); *G06T 1/20* (2013.01); *G09G 5/363* (2013.01)

(58) Field of Classification Search
None
See application file for complete search history.

(56) References Cited

U.S. PATENT DOCUMENTS

| | | |
|---|---|---|
| 5,493,733 A | 2/1996 | Pospisil |
| 5,699,139 A | 12/1997 | Aastuen et al. |
| 6,465,856 B2 | 10/2002 | Gulvin et al. |

(Continued)

FOREIGN PATENT DOCUMENTS

| | | |
|---|---|---|
| CN | 1530319 A | 9/2004 |
| JP | 2004280107 A | 10/2004 |

(Continued)

OTHER PUBLICATIONS

International Search Report and Written Opinion—PCT/US2012/065354—ISA/EPO—Feb. 13, 2013.

(Continued)

*Primary Examiner* — Joseph Feild
*Assistant Examiner* — Henok Heyi
(74) *Attorney, Agent, or Firm* — Edward A. Gordon; Foley & Lardner LLP

(57) ABSTRACT

This disclosure provides systems, methods and apparatus for dissipating charge buildup within a display element with a conductive layer. The conductive layer is maintained in electrical contact with a fluid within the display element. The fluid, in turn, remains in contact with light modulators within the display elements. Any charge buildup that may be caused by the filling of the fluid during fabrication of the display device, or during operation of the light modulators can be dissipated by the conductive layer. Thus, by dissipating the charge buildup, the conductive layer reduces or eliminates electrostatic forces due to the charge buildup that may affect the operability of the light modulators. The display can include conductive spacers in an active display region of the display and a spacer-free region that allows the substrates to deform while retaining an electrical connection between the conductive layer and the spacers in the active display region.

27 Claims, 21 Drawing Sheets

(51) Int. Cl.
*G06F 3/00* (2006.01)
*G02B 26/02* (2006.01)

(56) References Cited

U.S. PATENT DOCUMENTS

| | | |
|---|---|---|
| 6,816,226 B2 | 11/2004 | Bouten |
| 7,567,334 B2 | 7/2009 | Kadotani |
| 7,675,665 B2 | 3/2010 | Hagood et al. |
| 7,920,317 B2 | 4/2011 | Lee et al. |
| 8,077,286 B2 | 12/2011 | Takeda et al. |
| 8,144,389 B2 | 3/2012 | Oikawa et al. |
| 8,526,096 B2 | 9/2013 | Steyn et al. |
| 2003/0179986 A1 | 9/2003 | Martin et al. |
| 2004/0179259 A1* | 9/2004 | Fujii et al. ............... 359/297 |
| 2005/0088767 A1 | 4/2005 | Reboa |
| 2007/0205969 A1 | 9/2007 | Hagood et al. |
| 2008/0013145 A1 | 1/2008 | Chui et al. |
| 2008/0013174 A1* | 1/2008 | Allen et al. ............... 359/487 |
| 2008/0094551 A1* | 4/2008 | Hayashi et al. ........... 349/106 |
| 2008/0283175 A1* | 11/2008 | Hagood et al. ........... 156/145 |
| 2009/0279043 A1* | 11/2009 | Kimura et al. ............ 349/186 |
| 2010/0027100 A1* | 2/2010 | Lee et al. .................. 359/290 |
| 2011/0032246 A1 | 2/2011 | Hong et al. |
| 2011/0157679 A1* | 6/2011 | Fike et al. ................. 359/290 |
| 2011/0217629 A1* | 9/2011 | Okuyama et al. ........... 430/4 |
| 2012/0153309 A1 | 6/2012 | Kim et al. |

FOREIGN PATENT DOCUMENTS

| | | |
|---|---|---|
| JP | 4394287 B2 | 1/2010 |
| WO | 2008091339 A2 | 7/2008 |
| WO | 2009102471 A1 | 8/2009 |

OTHER PUBLICATIONS

Taiwan Search Report—TW101144593—TIPO—Jul. 3, 2014.

* cited by examiner

ELECTROMECHANICAL SYSTEMS DISPLAY APPARATUS INCORPORATING CHARGE DISSIPATION SURFACES

RELATED APPLICATION

This patent application claims priority to U.S. Provisional Patent Application No. 61/565,159, filed on Nov. 30, 2011, entitled "Electromechanical Assemblies and Methods of Making the Same." The disclosure of the prior application is considered part of, and is incorporated by reference in, this patent application.

TECHNICAL FIELD

This disclosure relates to the field of imaging displays, and in particular to dissipation of charge buildup within display elements.

DESCRIPTION OF THE RELATED TECHNOLOGY

Electromechanical systems (EMS) devices, such as nano-electromechanical systems (NEMS) and microelectromechanical systems (MEMS) devices, can include display elements having light modulators. The light modulators can be immersed in a lubricating fluid. In some instances, charges can buildup within a cavity that encloses the light modulators and the fluid. This charge buildup can produce electrostatic forces that may hinder the movement of the light modulators.

While charge may build on virtually any of the surfaces of the display apparatus, charge build up on a substrate surface proximate to parallel planar structures of a light modulator, such as a shutter, can be particularly vexing due to their proximity and the relatively large size of their adjacent surface areas. In some instances, the resultant electrostatic forces may result in the light modulators sticking or adhering to the substrate surface. The light modulators may then be stuck in an undesired open, closed, or intermediate position. In other instances, if the charge buildup is large enough, the resulting strong electrostatic forces may pull the light modulators with enough force to bend beams that support the light modulators. This may cause the light modulators to become permanently inoperable.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus having a first substrate defining a first planar surface of a cavity. The apparatus also includes a second substrate defining a second planar surface of the cavity opposite from the first planar surface. At least one light modulator, attached to the first planar surface and disposed within the cavity, is configured to move from a first position within the cavity to a second position within the cavity. A fluid, is disposed in the cavity, in which the light modulator is immersed. A transparent electrically conductive layer is disposed on the second planar surface and in contact with the fluid to dissipate charge migrating through the fluid. In some implementations, a major surface of the transparent electrically conductive layer is in contact with the fluid.

In some implementations, the at least one light modulator can include a shutter configured to transmit or reflect light out of the cavity in one of the first and second positions and to prevent light from propagating out of the cavity in the other of the first and second positions. In some implementations, the at least one light modulator is further configured to move into at least a third position within the cavity.

In some other implementations, the at least one light modulator and the transparent electrically conductive layer can be at substantially the same electrical potential. In some implementations, a conductive spacer can be disposed within the cavity and in electrical communication with the light modulator and the transparent electrically conductive layer. In some such implementations, the apparatus also includes a display region surrounding the conductive spacer and the at least one light modulator. A plurality of additional conductive spacers are positioned within the display region. An edge seal surrounds the display region coupling the first substrate to the second substrate. A spacer-free region is positioned between the edge seal and the display region such that the plurality of spacers substantially prevents the first and second substrates from deforming within the display region and at least one of the first and second substrates is free to deform within the spacer-free region. In some other implementations, the at least one light modulator and the transparent electrically conductive layer can be at ground potential. In some implementations, the at least one light modulator can include at least part of at least one pixel, the at least one pixel defining at least part of a display viewing area.

In some other implementations, the at least one pixel also can include at least one aperture defined by the first substrate or the second substrate, where the transparent electrically conductive layer extends over at least 20% of the at least one aperture. In some implementations, the transparent electrically conductive layer can include indium tin oxide (ITO).

In some other implementations, the apparatus also can include a display including the first substrate, the second substrate, the at least one light modulator, the fluid, the transparent electrically conductive layer. The display also can include a processor that is configured to communicate with the display, the processor being configured to process image data. The display also includes a memory device that is configured to communicate with the processor.

In some implementations, the apparatus also includes a driver circuit configured to send at least one signal to the display, and a controller configured to send at least a portion of the image data to the driver circuit. In some implementations, the apparatus includes an image source module configured to send the image data to the processor, where the image source module includes at least one of a receiver, transceiver, and transmitter. In some other implementations the apparatus also includes an input device configured to receive input data and to communicate the input data to the processor.

Another innovative aspect of the subject matter described in this disclosure can be implemented in an apparatus including a first substrate defining a first planar surface of a cavity. The apparatus also includes a second substrate defining a second planar surface of the cavity opposite from the first planar surface. At least one light modulator that is attached to the first planar surface and disposed within the cavity is configured to move from a first position within the cavity to a second position within the cavity. A fluid is disposed in the cavity, in which the light modulator is immersed. A light-absorbing electrically conductive layer is disposed on the second planar surface and in contact with the fluid to dissipate charge migrating through the fluid, where the at least one light modulator and the light-absorbing electrically conductive layer can be at substantially the same electrical potential. In some implementations, a major surface of the light-absorbing electrically conductive layer is in contact with the fluid.

In some implementations, at least one light modulator can include a shutter configured to transmit or reflect light out of the cavity in one of the first and second positions and to prevent light from propagating out of the cavity in the other of the first and second positions. In some implementations, at least one light modulator is further configured to move into at least a third position within the cavity.

In some implementations, the at least one light modulator and the light-absorbing electrically conductive layer can be at substantially the same electrical potential. In some other implementations, a conductive spacer can be disposed within the cavity and in electrical communication with the light modulator and the light-absorbing electrically conductive layer. In some such implementations, the apparatus also includes a display region surrounding the conductive spacer and the at least one light modulator. A plurality of additional conductive spacers are positioned within the display region. An edge seal surrounds the display region coupling the first substrate to the second substrate. A spacer-free region is positioned between the edge seal and the display region such that the plurality of spacers substantially prevents the first and second substrates from deforming within the display region and at least one of the first and second substrates is free to deform within the spacer-free region. In some other implementations, at least one light modulator and the light-absorbing electrically conductive layer can be at ground potential.

In some implementations, at least one light modulator can include at least part of at least one pixel, at least one pixel defining at least part of a display viewing area. In some implementations, at least one pixel also can include at least one aperture defined by the first substrate or the second substrate, and the light-absorbing electrically conductive layer extends over part of the at least one aperture.

Another innovative aspect of the subject matter described in this disclosure can be implemented in a method of reducing electrostatic attraction between a light modulator attached to a first planar surface of a cavity and a second planar surface of the cavity opposite the first planar surface. The method includes providing a first substrate that defines the first planar surface of the cavity, providing a second substrate that defines the second planar surface of the cavity opposite the first planar surface, providing a transparent electrically conductive layer disposed on the second planar surface of the cavity, providing a fluid in contact with the light modulator and the transparent electrically conductive layer, and dissipating charge in the cavity via the transparent electrically conductive layer. In some implementations, the fluid is in contact with a major surface of the electrically conductive layer.

In some implementations, the method can include applying a first electrical potential to the light modulator, and applying a second electrical potential to the transparent electrically conductive layer such that the first and second electrical potentials are substantially the same. In some implementations, the first and second electrical potential is applied before immersing the light modulator in the fluid. In some other implementations, the method can include immersing the light modulator in the fluid before applying the first and second electrical potentials, removing the first and second electrical potentials after immersing the light modulator in the fluid, and sealing the cavity.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCDs), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
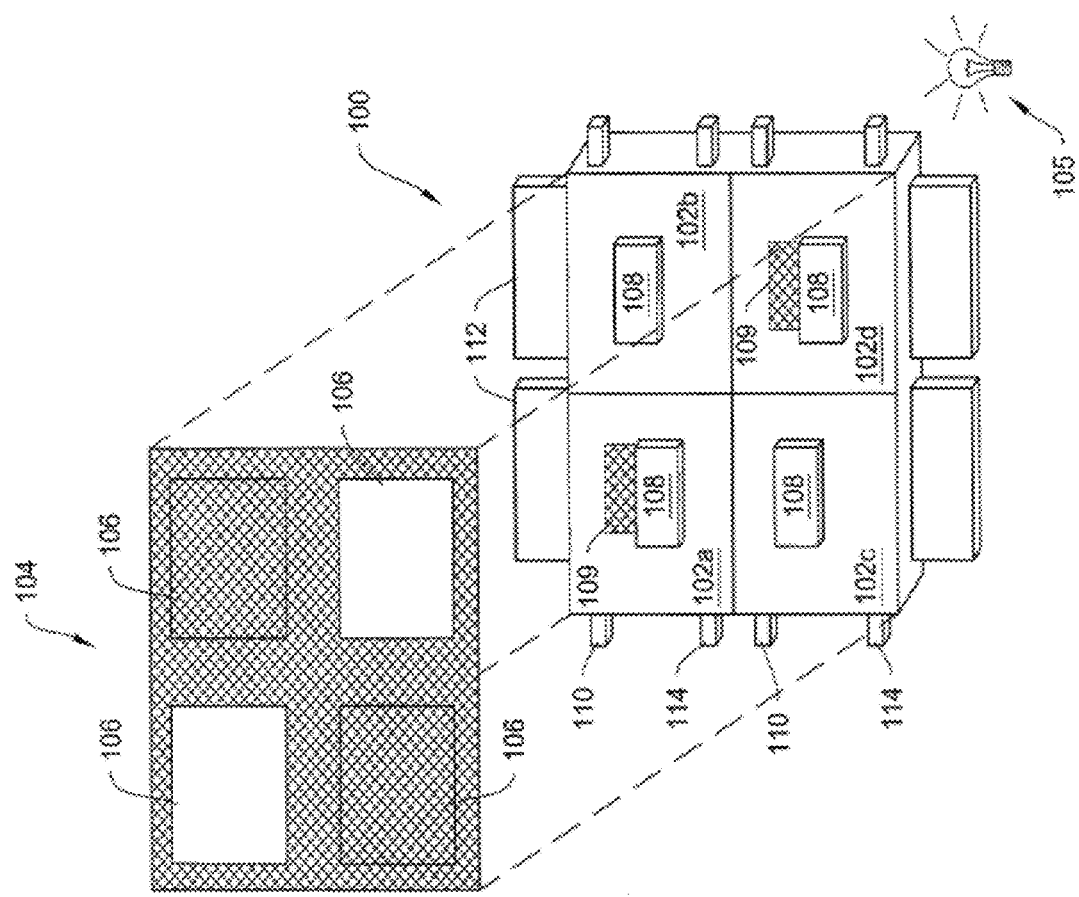
FIG. 1A shows an example schematic diagram of a direct-view microelectromechanical systems (MEMS) based display apparatus.

Some displays include a fluid within a cavity that encloses an array of display elements. In some instances, a charge buildup within the cavity results in formation of electrostatic forces, which may cause incorrect operation, or damage, to the display elements. The addition of a conductive layer in contact with the fluid can serve to dissipate the charge buildup, thus reducing or eliminating the potentially damaging electrostatic forces.

In some implementations the conductive layer is a light absorbing conductive layer that is disposed in electrical contact with the fluid in the cavity of the display element. The light absorbing conductive layer is formed such that it does not substantially obstruct any apertures or other light transmissive regions within the optical path of the display elements. In some implementations, the light absorbing conductive layer includes traces that extend into and across the apertures and the light transmissive regions. The size and the spacing of the traces are selected to avoid substantial obstruction of the apertures and the light transmissive regions while at the same time providing effective dissipation of the charge buildup within the cavity of the display element.

In some implementations, the conductive layer is a transparent conductive layer. The transparent conductive layer is disposed within the cavity such that it is in electrical contact with the fluid. The transparent conductive layer can extend over the apertures and light transmissive regions to provide effective dissipation of the charge buildup within the cavity without substantially obstructing light passing through the apertures or light transmissive regions.

In some implementations, the conductive layer includes multiple electrically isolated conductive regions. Each electrically isolated region is associated with only one pixel. Each region corresponding to a pixel is in electrical contact with a shutter associated with only that pixel. The conductive region and the shutter can be connected via interconnects formed by conductive spacers and by conductive anchors supporting the shutter. In some such implementations, the display includes a spacer-free region that allows for the deformation of one or more of the substrates, while retaining an electrical connection between the conductive layer and the conductive spacers in an active display region of the display.

In some implementations, the conductive layer is electrically connected to all of the shutters of all of the display elements. The conductive layer is connected to the shutters via conductive spacers or via conductive edge seals. The conductive layer and all of the shutters can thus be operated at a common global potential.

In some implementations, the dissipation of charge buildup can be achieved during the filling of the fluid into the cavity of the display apparatus. In such implementations, a common electrical potential can be applied to both the conductive layer and to the shutters of the display elements while the fluid is being filled. In some other implementations, the common electrical potential may be removed after completing filling the fluid.

In some implementations, the dissipation of charge buildup can be achieved during the operation of the display apparatus. In such implementations, the charge buildup is dissipated by electrically connecting the conductive layer with the shutters associated with the display elements included in the display apparatus such that the conductive layer, or portions thereof, is kept at a common potential as the shutters.

Particular implementations of the subject matter described in this disclosure can be implemented to realize one or more of the following potential advantages. The inclusion of a conductive layer within a cavity of a display device and in electrical contact with a fluid in the cavity helps in dissipating charge migrating through the fluid. By dissipating the charge, the conductive layer helps to reduce electrostatic forces that may be generated by the charge. Because the electrostatic forces are reduced, the risks of incorrect operation of light modulators due to the effect of these electrostatic forces are also reduced.

Charge may accumulate over several non-conductive surfaces of the cavity. While it may be difficult to dissipate all of the accumulated charge within the cavity—for example, because some surfaces benefit from being coated with non-conductive insulating layers—by placing the conductive layer over at least some of the surfaces, such as over an aperture plate and/or over a cover plate, reduces the overall charge accumulated within the cavity. As a result, risks associated with the electrostatic forces (generated by the charge) acting on the light modulator are reduced.

In some implementations, the conductive layer can be a light absorbing layer to help absorb stray light and improve the contrast ratio of the display device. In some other implementations the conductive layer can be transparent, and therefore, can extend over apertures of the display device and cover a larger portion of the cavity. Thus, the transparent conductive layer can dissipate additional charge over a larger portion of the cavity of the display device.

In some implementations, placing the light modulators and the conductive layer at the same electrical potential further helps in dissipating charge in the fluid. In some implementations conductive spacers within the display device can aid in electrically connecting the conductive layer and the light modulators. In some implementations, the conductive layer and the light modulator are placed at equal potential before the fluid is filled in the cavity to help dissipate charge that may accumulate before or during the filling of the fluid. In some such implementations, the inclusion of a spacer-free region can help prevent the formation of bubbles in low operating temperatures, while at the same time allowing the conductive layer and the conductive spacers to retain an electrical connection.

Having the conductive layer in contact with the fluid helps in providing an electrical contact with an aperture plate of the display device without having to perform an assembly process step of etching through a non-conductive layer to provide such connection.

In some implementations, the conductive layer includes electrically isolated conductive regions. The electrically conductive regions can be coupled to corresponding shutters positioned proximate the isolated regions. Such a configuration has the advantage of allowing for drive schemes in which actuation voltages are selectively applied directly to a shutter, instead of to drive actuators located near the shutters.

FIG. 1A shows a schematic diagram of a direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (such as interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
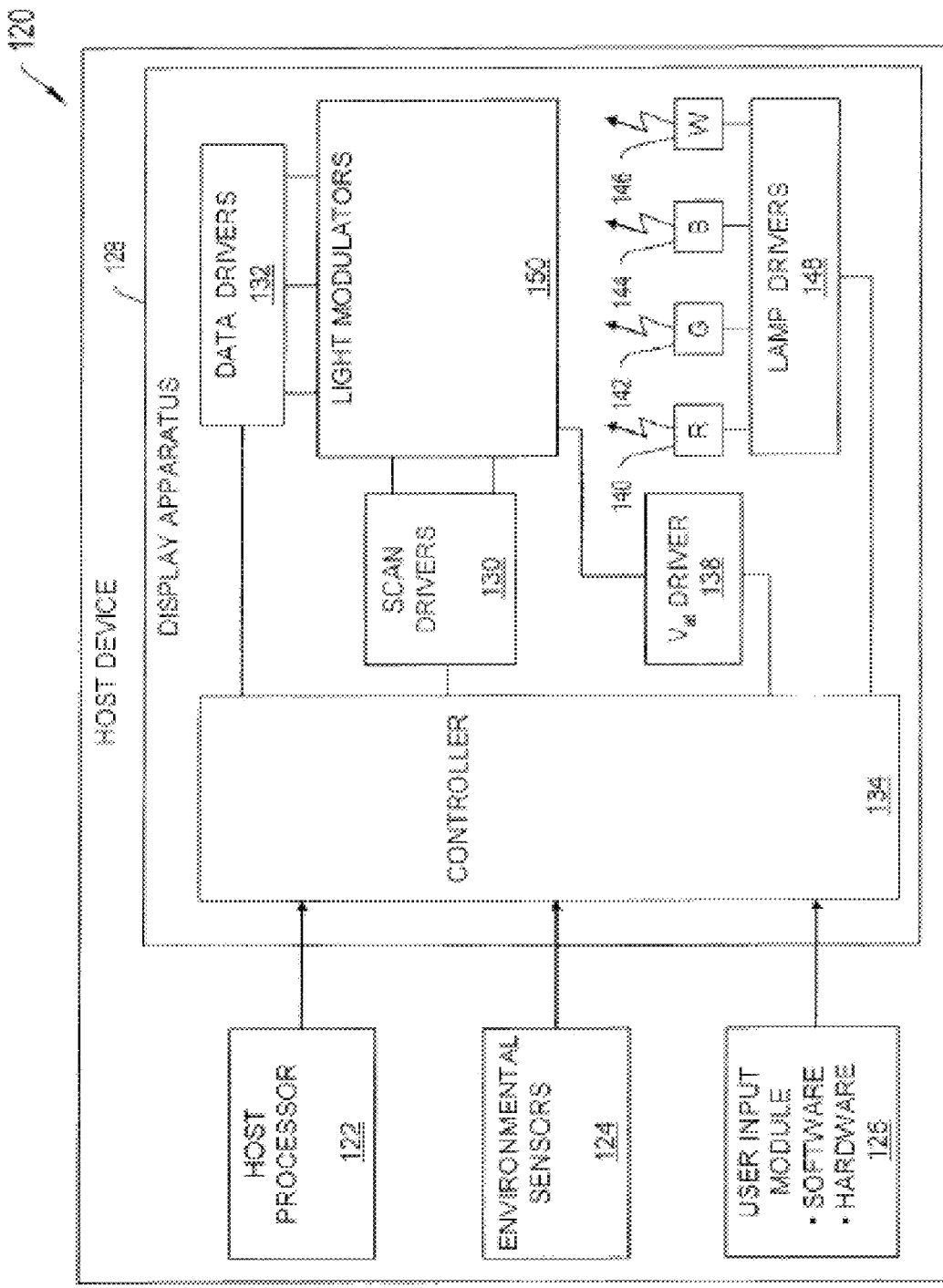
FIG. 1B shows an example block diagram of a host device.

FIG. 1B shows an example of a block diagram of a host device 120 (i.e., cell phone, smart phone, PDA, MP3 player, tablet, e-reader, etc.). The host device 120 includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and an array 150 of display elements, such as the light modulators 102 shown in FIG. 1A. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (e.g., scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array 150 of display elements, the output of voltages from the data drivers 132, and the output of voltages that provide for display element actuation.

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array 150, for instance by addressing only every $5^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120. The environmental sensor module 124 receives data about the ambient environment, such as temperature and or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
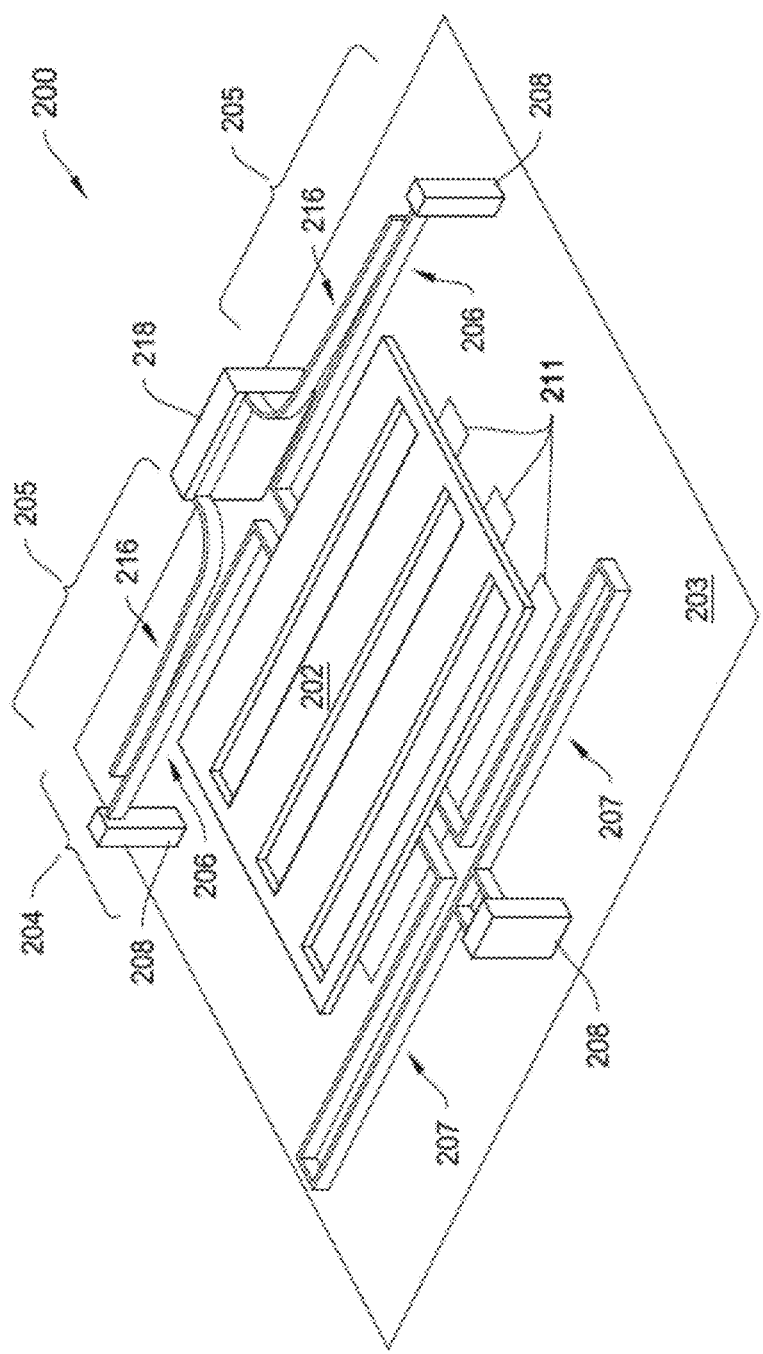
FIG. 2A shows an example perspective view of an illustrative shutter-based light modulator.

FIG. 2A shows a perspective view of an illustrative shutter-based light modulator 200. The shutter-based light modulator 200 is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface 203 includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely toward the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as the light modulator 200, incorporates a passive restoring force, such as a spring, for returning a shutter to its rest position after voltages have been removed. Other shutter assemblies can incorporate a dual set of "open" and "closed" actuators and a separate set of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

Figure 2B:
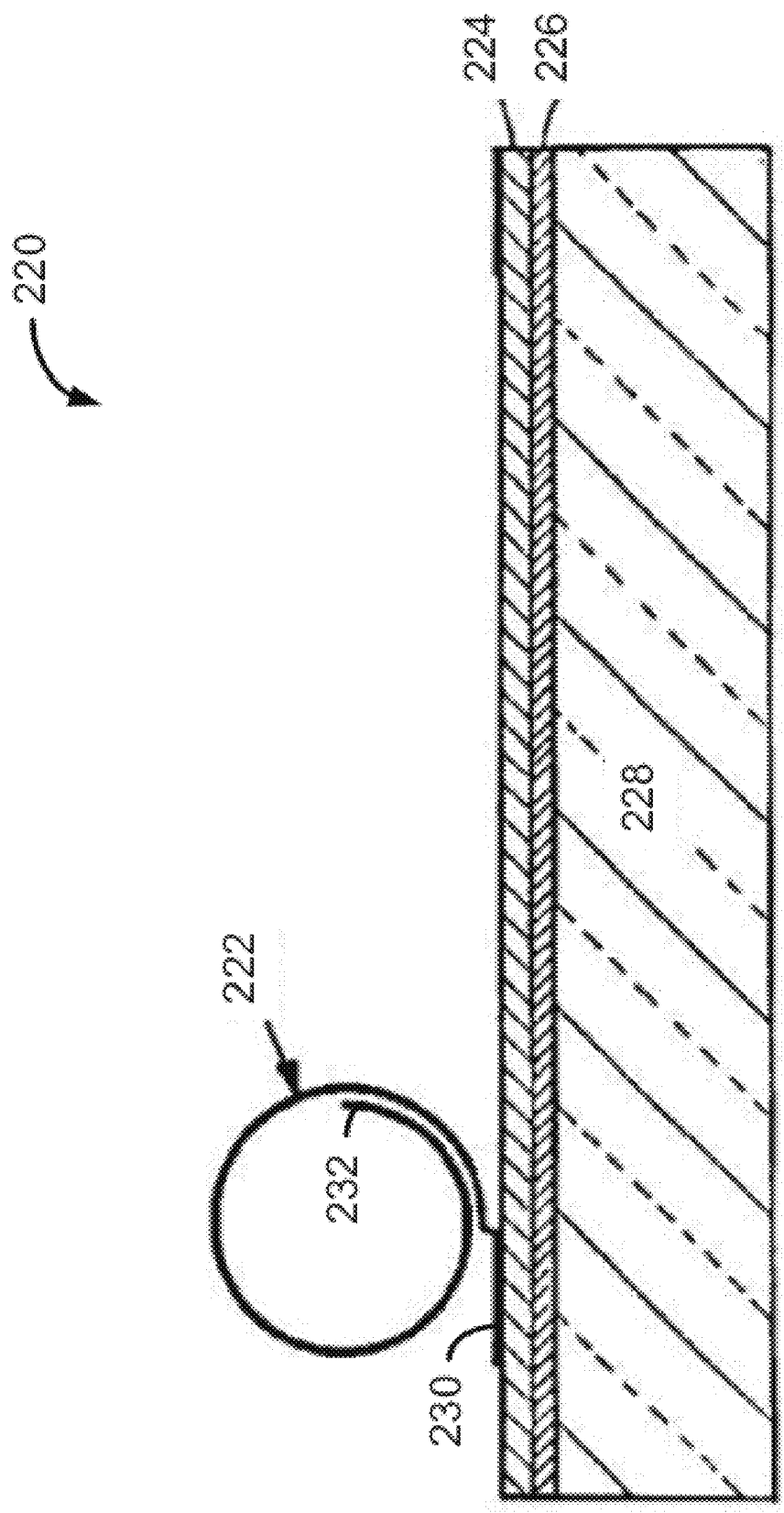
FIG. 2B shows a cross sectional view of a rolling actuator shutter-based light modulator.

The display apparatus 100, in alternative implementations, includes display elements other than transverse shutter-based light modulators, such as the shutter assembly 200 described above. For example, FIG. 2B shows a cross sectional view of a rolling actuator shutter-based light modulator 220. The rolling actuator shutter-based light modulator 220 is suitable for incorporation into an alternative implementation of the MEMS-based display apparatus 100 of FIG. 1A. A rolling actuator-based light modulator includes a movable electrode disposed opposite a fixed electrode and biased to move in a particular direction to function as a shutter upon application of an electric field. In some implementations, the light modulator 220 includes a planar electrode 226 disposed between a substrate 228 and an insulating layer 224 and a movable electrode 222 having a fixed end 230 attached to the insulating layer 224. In the absence of any applied voltage, a movable end 232 of the movable electrode 222 is free to roll towards the fixed end 230 to produce a rolled state. Application of a voltage between the electrodes 222 and 226 causes the movable electrode 222 to unroll and lie flat against the insulating layer 224, whereby it acts as a shutter that blocks light traveling through the substrate 228. The movable electrode 222 returns to the rolled state by means of an elastic restoring force after the voltage is removed. The bias towards a rolled state may be achieved by manufacturing the movable electrode 222 to include an anisotropic stress state.

Figure 2C:
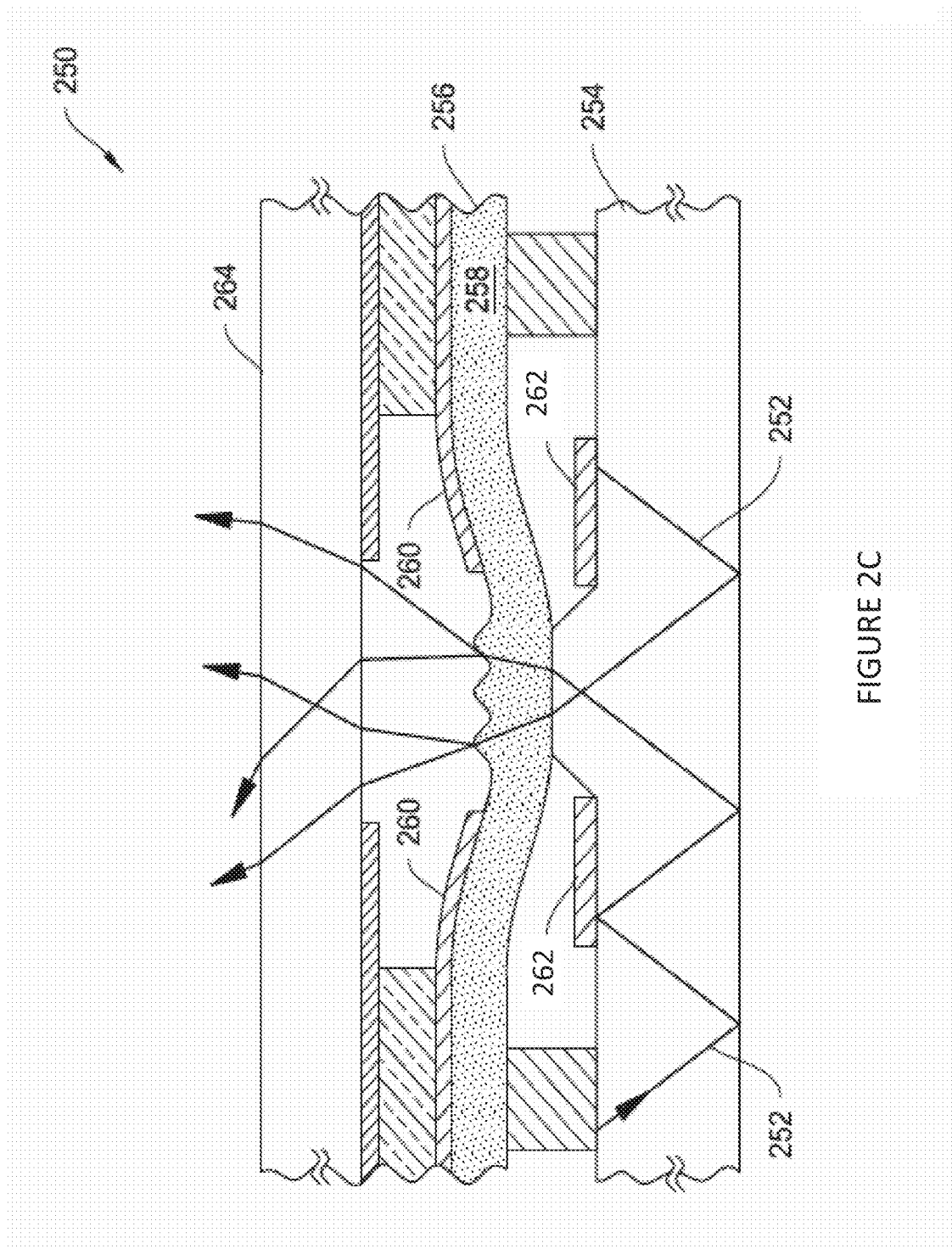
FIG. 2C shows a cross sectional view of an illustrative non shutter-based MEMS light modulator.

FIG. 2C shows a cross sectional view of an illustrative non shutter-based MEMS light modulator 250. The light tap modulator 250 is suitable for incorporation into an alternative implementation of the MEMS-based display apparatus 100 of FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 2D:
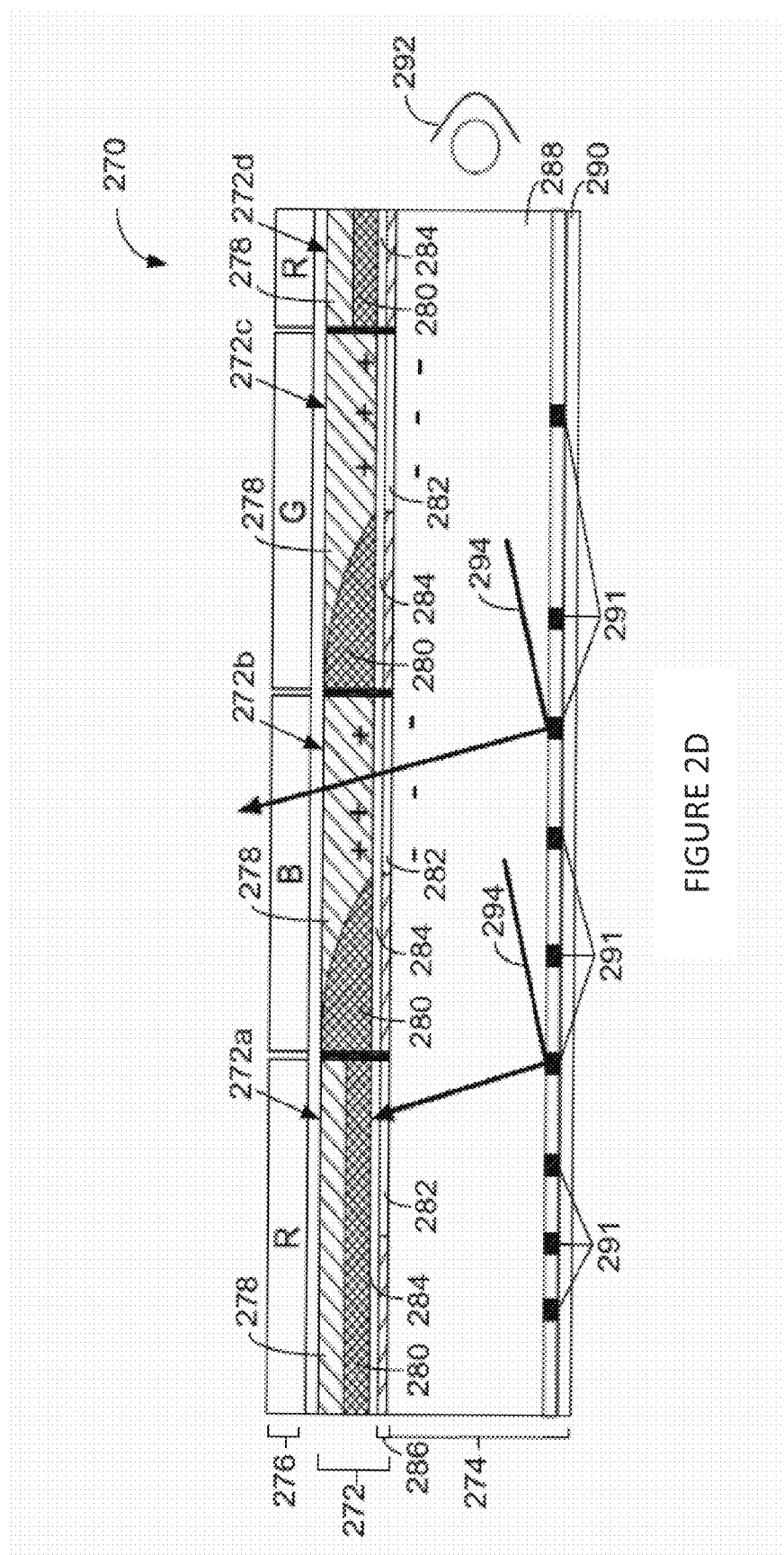
FIG. 2D shows a cross sectional view of an electrowetting-based light modulation array.

FIG. 2D shows an example cross sectional view of an electrowetting-based light modulation array 270. The electrowetting-based light modulation array 270 is suitable for incorporation into an alternative implementation of the MEMS-based display apparatus 100 of FIG. 1A. The light modulation array 270 includes a plurality of electrowetting-based light modulation cells 272a-d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide (ITO)) and an insulating layer 284 positioned between the layer of light absorbing oil 280 and the transparent electrode 282. In the implementation described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One or more light sources 292, such as LEDs, inject light 294 into the light guide 288.

In an alternative implementation, an additional transparent substrate (not shown) is positioned between the light guide 288 and the light modulation array 270. In this implementation, the reflective aperture layer 286 is formed on the additional transparent substrate instead of on the surface of the light guide 288.

In operation, application of a voltage to the electrode 282 of a cell (for example, cell 272b or 272c) causes the light absorbing oil 280 in the cell to collect in one portion of the cell 272. As a result, the light absorbing oil 280 no longer obstructs the passage of light through the aperture formed in the reflective aperture layer 286 (see, for example, cells 272b and 272c). Light escaping the backlight at the aperture is then able to escape through the cell and through a corresponding color filter (for example, red, green or blue) in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area is non-transmissive, whether a voltage is applied or not. Therefore, without the inclusion of the reflective portions of reflective apertures layer 286, this area absorbs light that otherwise could be used to contribute to the formation of an image. However, with the inclusion of the reflective aperture layer 286, this light, which otherwise would have been absorbed, is reflected back into the light guide 290 for future escape through a different aperture. The electrowetting-based light modulation array 270 is not the only example of a non-shutter-based MEMS modulator suitable for inclusion in the display apparatus described herein. Other forms of non-shutter-based MEMS modulators could likewise be controlled by various ones of the controller functions described herein without departing from the scope of this disclosure.

Figure 3A:
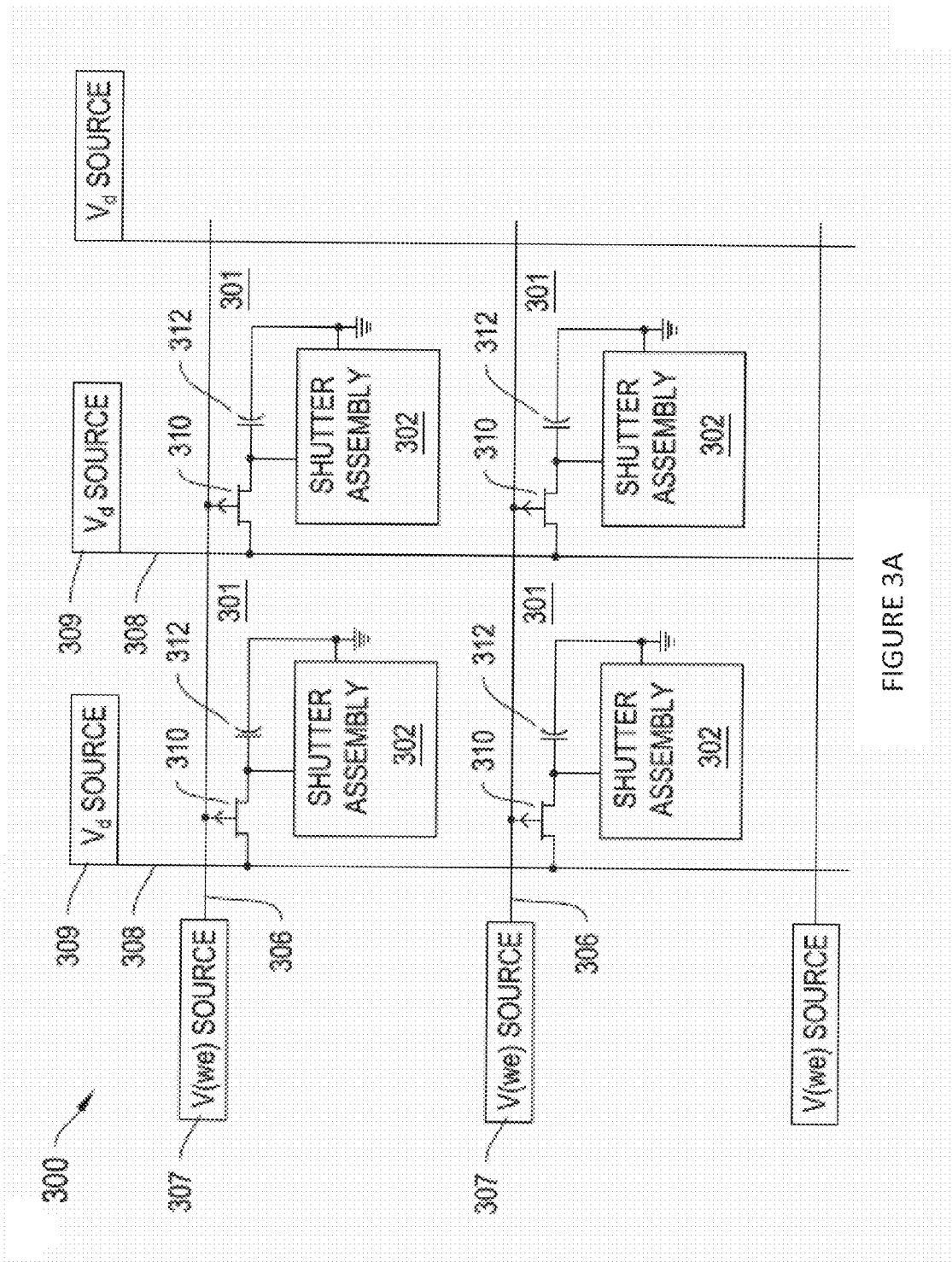
FIG. 3A shows an example schematic diagram of a control matrix.
Figure 3B:
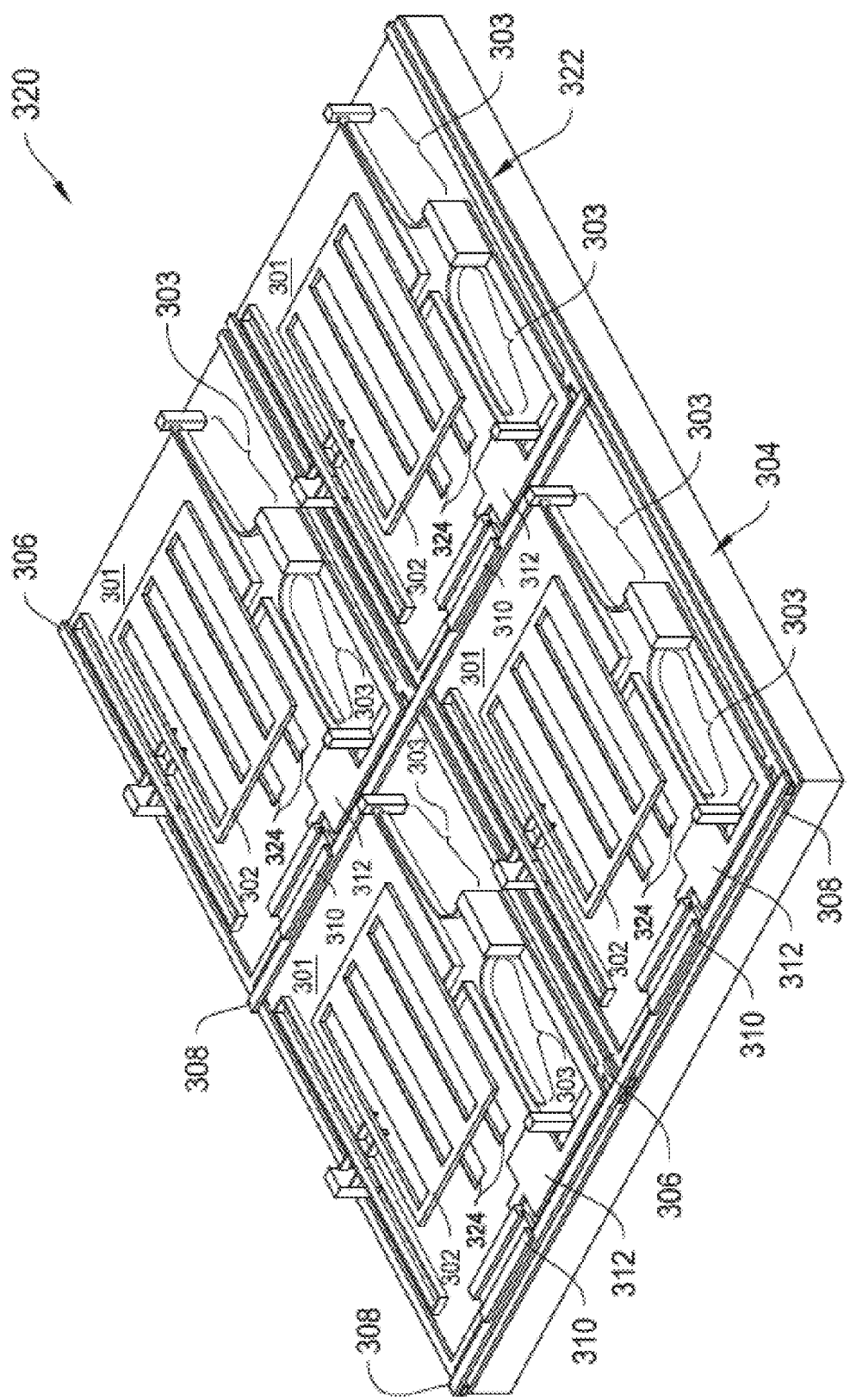
FIG. 3B shows a perspective view of an array of shutter-based light modulators connected to the control matrix of FIG. 3A.

FIG. 3A shows an example schematic diagram of a control matrix 300. The control matrix 300 is suitable for controlling the light modulators incorporated into the MEMS-based display apparatus 100 of FIG. 1A. FIG. 3B shows a perspective view of an array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2A, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array 320 includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (e.g., open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as the spring 207 in the shutter-based light modulator 200 depicted in FIG. 2A, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on' or "off" optical states in each pixel. Certain forms of coded area division gray scale are possible where multiple MEMS light modulators in the pixel are provided, and where apertures 324, which are associated with each of the light modulators, have unequal areas.

In some other implementations, the roller-based light modulator 220, the light tap 250, or the electrowetting-based light modulation array 270, as well as other MEMS-based light modulators, can be substituted for the shutter assembly 302 within the light modulator array 320.

Figure 4A:
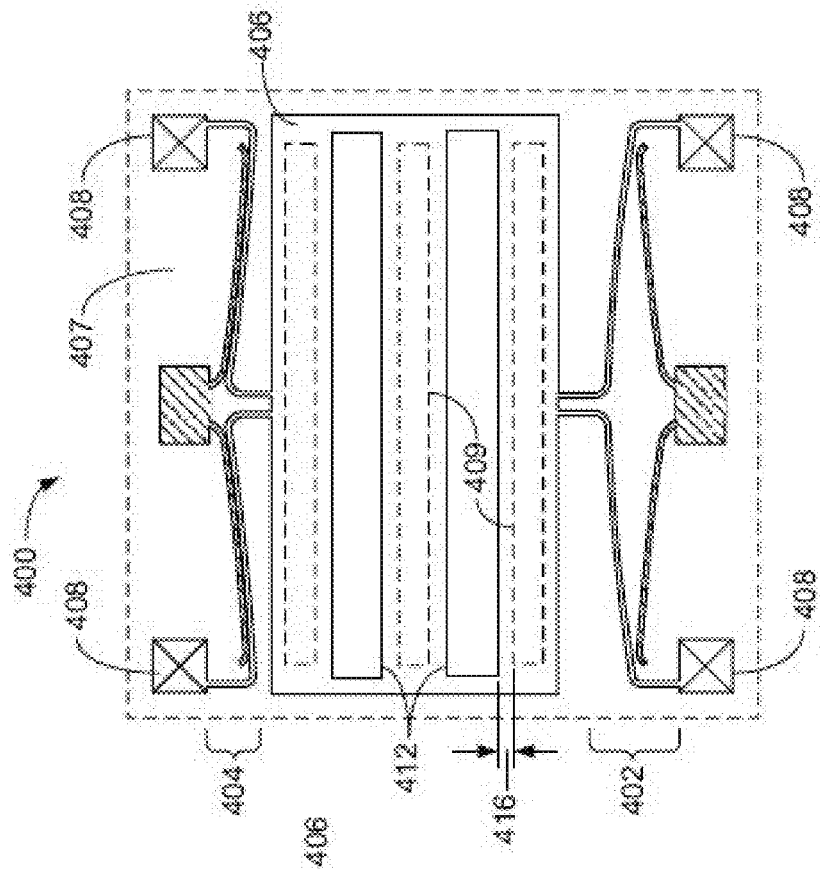
FIGS. 4A and 4B show example views of a dual actuator shutter assembly.
Figure 4B:
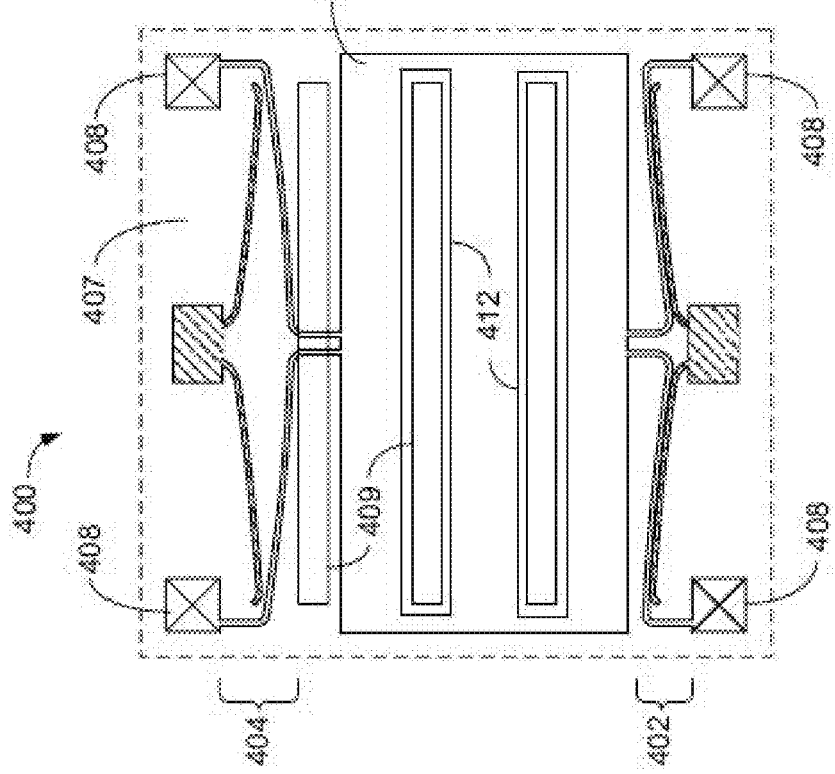

FIGS. 4A and 4B show example views of a dual actuator shutter assembly 400. The dual actuator shutter assembly 400, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with the shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B the shutter assembly 400 has been moved to the closed state and, as such, the shutter-open actuator 402 is in its relaxed position, the shutter-close actuator 404 has been actuated, and the light blocking portions of the shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in the aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 5:
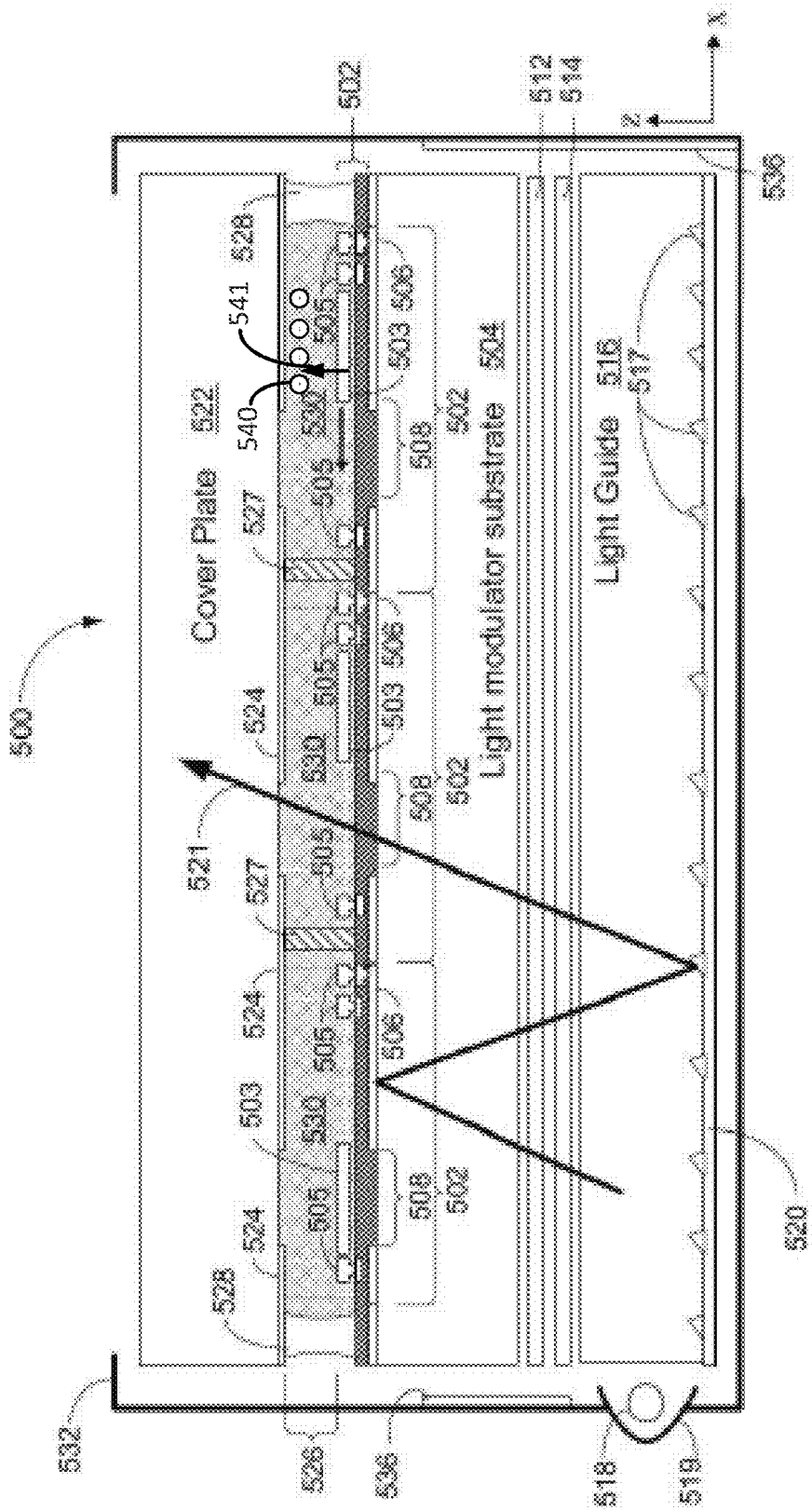
FIG. 5 shows an example cross sectional view of a display apparatus incorporating shutter-based light modulators.

FIG. 5 shows an example cross sectional view of a display apparatus 500 incorporating shutter-based light modulators (shutter assemblies) 502. Each shutter assembly 502 incorporates a shutter 503 and an anchor 505. Not shown are the compliant beam actuators which, when connected between the anchors 505 and the shutters 503, help to suspend the shutters 503 a short distance above the surface. The shutter assemblies 502 are disposed on a transparent substrate 504, such a substrate made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition (CVD). In some other implementations, the rear-facing reflective layer 506 can be formed from a mirror, such as a dielectric mirror. A dielectric mirror can be fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 depicted in FIG. 4B.

The display apparatus 500 includes an optional diffuser 512 and/or an optional brightness enhancing film 514 which separate the substrate 504 from a planar light guide 516. The light guide 516 includes a transparent, i.e., glass or plastic material. The light guide 516 is illuminated by one or more light sources 518, forming a backlight. The light sources 518 can be, for example, and without limitation, incandescent lamps, fluorescent lamps, lasers or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion light that fails to leave the display apparatus 500 to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light redirectors 517 can be molded into the plastic body of light guide 516 with shapes that can be alternately triangular, trapezoidal, or curved in cross section. The density of the prisms 517 generally increases with distance from the lamp 518.

In some implementations, the aperture layer 506 can be made of a light absorbing material, and in alternate implementations the surfaces of shutter 503 can be coated with either a light absorbing or a light reflecting material. In some other implementations, the aperture layer 506 can be deposited directly on the surface of the light guide 516. In some implementations, the aperture layer 506 need not be disposed on the same substrate as the shutters 503 and anchors 505 (such as in the MEMS-down configuration described below).

In some implementations, the light sources 518 can include lamps of different colors, for instance, the colors red, green and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps, or red, green, blue and yellow lamps. In some other implementations, the light source 518 may include cyan, magenta, yellow and white lamps, red, green, blue and white lamps. In some other implementations, additional lamps may be included in the light source 518. For example, if using five colors, the light source 518 may include red, green, blue, cyan and yellow lamps. In some other implementations, the light source 518 may include white, orange, blue, purple and green lamps or white, blue, yellow, red and cyan lamps. If using six colors, the light source 518 may include red, green, blue, cyan, magenta and yellow lamps or white, cyan, magenta, yellow, orange and green lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a fluid 530. The fluid 530 is engineered with viscosities preferably below about 10 centipoise and with relative dielectric constant preferably above about 2.0, and dielectric breakdown strengths above about $10^4$ V/cm. The fluid 530 also can serve as a lubricant. In some implementations, the fluid 530 is a hydrophobic liquid with a high surface wetting capability. In alternate implementations, the fluid 530 has a refractive index that is either greater than or less than that of the substrate 504.

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a fluid (also referred to as fluid 530) and sealing the fluid (e.g., with an adhesive) within a fluid space or gap in a MEMS display cell. The fluid 530 is usually one with a low coefficient of friction, low viscosity, and minimal degradation effects over the long term. When the MEMS-based display assembly includes a liquid for the fluid 530, the liquid at least partially surrounds some of the moving parts of the MEMS-based light modulator. In some implementations, in order to reduce the actuation voltages, the liquid has a viscosity below 70 centipoise. In some other implementations, the liquid has a viscosity below 10 centipoise. Liquids with viscosities below 70 centipoise can include materials with low molecular weights: below 4000 grams/mole, or in some cases below 400 grams/mole. Fluids 530 that also may be suitable for such implementations include, without limitation, de-ionized water, methanol, ethanol and other alcohols, paraffins, olefins, ethers, silicone oils, fluorinated silicone oils, or other natural or synthetic solvents or lubricants. Useful fluids can be polydimethylsiloxanes (PDMS), such as hexamethyldisiloxane and octamethyltrisiloxane, or alkyl methyl siloxanes such as hexylpentamethyldisiloxane. Useful fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. Other fluids considered for these display assemblies include butyl acetate and dimethylformamide. Still other useful fluids for these displays include hydro fluoro ethers, perfluoropolyethers, hydro fluoro poly ethers, pentanol, and butanol. Example suitable hydro fluoro ethers include ethyl nonafluorobutyl ether and 2-trifluoromethyl-3-ethoxydodecafluorohexane.

A sheet metal or molded plastic assembly bracket 532 holds the cover plate 522, the substrate 504, the backlight and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of the light guide 516 back into the light guide 516. Not depicted in FIG. 5 are electrical interconnects which provide control signals as well as power to the shutter assemblies 502 and the lamps 518.

In some other implementations, the roller-based light modulator 220, the light tap 250, or the electrowetting-based light modulation array 270, as depicted in FIGS. 2A-2D, as well as other MEMS-based light modulators, can be substituted for the shutter assemblies 502 within the display apparatus 500.

FIG. 5 also shows one example of an electrostatic charge buildup (referred to hereinafter as "the charge buildup") on a display cover plate 522. The charge buildup is represented by negative charges 540. While the FIG. 5 shows negative charges 540, the charge buildup also can by represented by positive charges or a combination of positive and negative charges.

The process of immersing various parts of the display apparatus 500 in the fluid 530 may result in charges migrating off such parts and into the fluid 530. Such charge migration also may result from friction between the shutters 503 and the fluid 530 when the shutters 503 are repeatedly moved between open and closed positions. In other instances, charge migration unrelated to friction with charged surfaces, such as the shutters 503, may cause the charge buildup.

Regardless of the causes, the charge buildup can produce undesirable effects in the operation of the display apparatus 500. In particular, the charge buildup can produce electrostatic forces between various parts of the display apparatus. Such electrostatic forces may cause undesirable movement of those parts. For example, a charge buildup on the cover plate 522 opposite a shutters 503 can exert electrostatic forces on the shutter 503 in a direction out of the plane of the shutter's intended motion. These forces may hinder the movement of the shutter 503. One example of such a force is shown by way of the arrow 541 in FIG. 5, in which the shutter 503 is pulled up towards the cover plate 522. In some instances, the electrostatic forces due to the charge buildup may result in the shutter 503 sticking or adhering to other surfaces within the display element 500. The shutter 503 may then be stuck in an undesired open, closed, or intermediate position. In other instances, if the charge buildup is large enough, the resulting strong electrostatic forces may pull the shutter 503 with enough force to bend or irreversibly damage the beams and anchors 505 that support the shutter 503. This may cause the shutter 503 to be permanently damaged, rendering the corresponding pixel inoperable. Approaches to mitigating the charge buildup are discussed in detail below with reference to FIGS. 7-13.

The display apparatus 500 is referred to as the MEMS-up configuration, wherein the MEMS based light modulators are formed on a front surface of the substrate 504, i.e., the surface that faces toward the viewer. The shutter assemblies 502 are built directly on top of the reflective aperture layer 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in the display apparatus 500 and is oriented such that the MEMS-based light modulators are positioned on the rear surface of the top substrate, i.e., the surface that faces away from the viewer and toward the light guide 516. The MEMS-based light modulators are thereby positioned directly opposite to and across a gap from the reflective aperture layer 506. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures is preferably less than 10 microns, or a distance that is less than the overlap between shutters and apertures, such as overlap 416.

Figure 6:
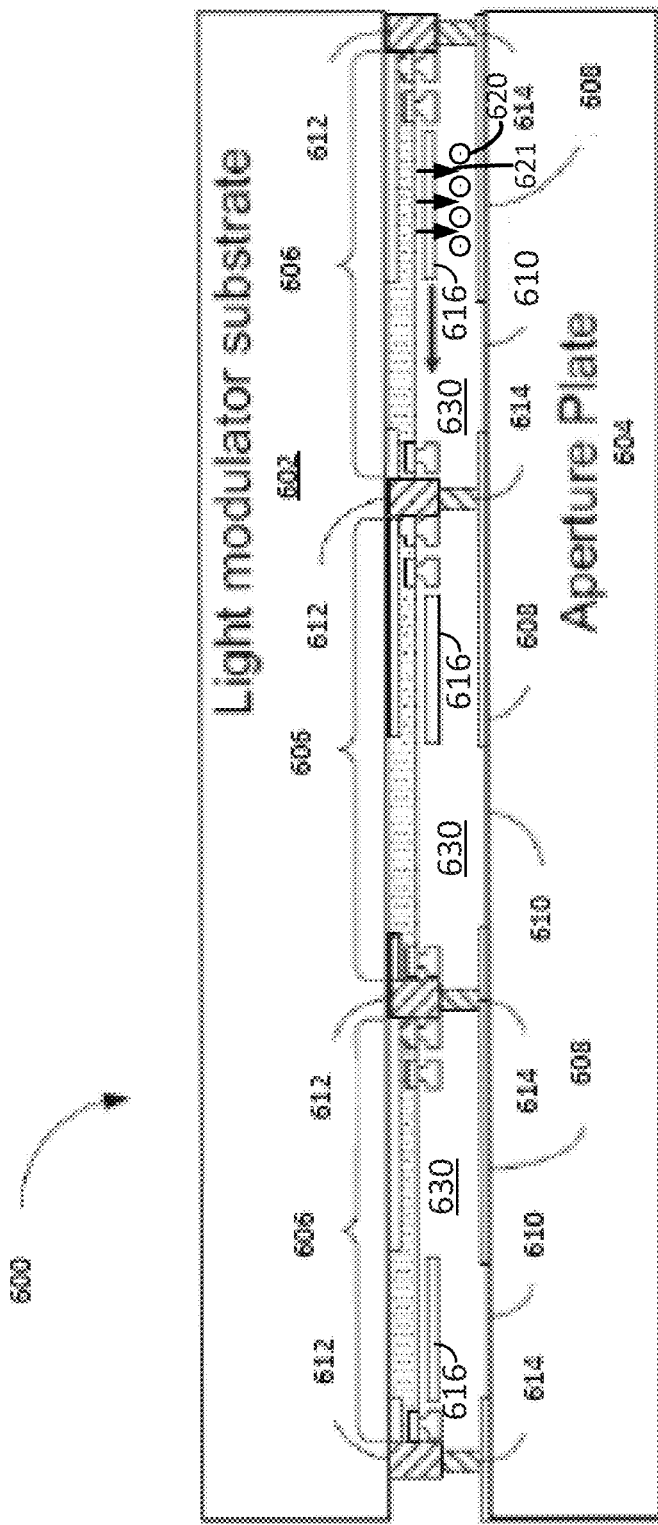
FIG. 6 shows a cross sectional view of a light modulator substrate and an aperture plate for use in a MEMS-down configuration of a display.

FIG. 6 shows a cross sectional view of a light modulator substrate and an aperture plate for use in a MEMS-down configuration of a display. The display assembly 600 includes a modulator substrate 602 and an aperture plate 604. The display assembly 600 also includes a set of shutter assemblies 606 and a reflective aperture layer 608. The shutter assemblies 606 include shutters 616. The reflective aperture layer 608 includes apertures 610. A predetermined gap or separation between the modulator substrates 602 and the aperture plate 604 is maintained by the opposing set of spacers 612 and 614. The spacers 612 are formed on or as part of the modulator substrate 602. The spacers 614 are formed on or as part of the aperture plate 604. During assembly, the two substrates 602 and 604 are aligned so that spacers 612 on the modulator substrate 602 make contact with their respective spacers 614.

The separation or distance of this illustrative example is 8 microns. To establish this separation, the spacers 612 are 2 microns tall and the spacers 614 are 6 microns tall. Alternately, both spacers 612 and 614 can be 4 microns tall, or the spacers 612 can be 6 microns tall while the spacers 614 are 2 microns tall. In fact, any combination of spacer heights can be employed as long as their total height establishes the desired separation.

Providing spacers on both of the substrates 602 and 604, which are then aligned or mated during assembly, has advantages with respect to materials and processing costs. The provision of a very tall, such as larger than 8 micron spacers, can be costly as it can require relatively long times for the cure, exposure, and development of a photo-imageable polymer. The use of mating spacers as in display assembly 600 allows for the use of thinner coatings of the polymer on each of the substrates.

In another implementation, the spacers 612 which are formed on the modulator substrate 602 can be formed from the same materials and patterning blocks that were used to form the shutter assemblies 606. For instance, the anchors employed for shutter assemblies 606 also can perform a function similar to spacer 612. In this implementation, a separate application of a polymer material to form a spacer would not be required and a separate exposure mask for the spacers would not be required.

Similar to the display apparatus 500 of FIG. 5, various parts of the display apparatus 600 also can be immersed in a fluid 630. Such fluid 630 can have properties similar to the ones discussed above for fluid 530 (shown in FIG. 5). Moreover, the fluid 630 also may transfer charge from the shutters 616 or actuators to a surface opposite the shutter 616, such as the reflective aperture layer 608. The resulting electrostatic forces, as discussed above, may cause undesirable movements of the shutter 616. For example, FIG. 6 shows a charge buildup 620 in the vicinity of the shutter 616 producing an electrostatic force, represented by the arrow 621, that pulls the shutter 616 down towards the aperture plate 604.

As discussed above, the presence of the charge buildup and the resulting electrostatic forces can cause temporary or permanent damage to the shutter assemblies (such as shutter assembly 606) rendering the corresponding pixel inoperable. Approaches to mitigating the charge buildup are discussed in detail below with reference to FIGS. 7-13.

Charge buildup may occur on any surface of the display apparatus. For example, charges may accumulate on the shutter, the aperture layer, the cover plate, etc. Typically, these surfaces are non-conductive. For example, shutter 503 (shown in FIG. 5) is typically coated with a passivation layer. The passivation layer is a non-conductive, and protects the shutter 503 from, among other things, chemical interaction with the surrounding fluid 530 (also shown in FIG. 5) and from stiction, etc. Because the passivation layer is non-conductive, charge buildup on the passivation layer may not get dissipated easily. Charge buildup may similarly occur on the other non-conductive surfaces of the display apparatus as well. While it may not be possible to completely dissipate all the charge buildup on all the surfaces of the display apparatus, providing a conductive layer 710 or 810 in the vicinity of the shutter 503, for example, on the cover plate or the aperture plate (as discussed below) helps dissipate a considerable amount of charge buildup, thereby substantially reducing the risk of inoperability of the shutter 503 associated with the charge buildup.

Figure 7:
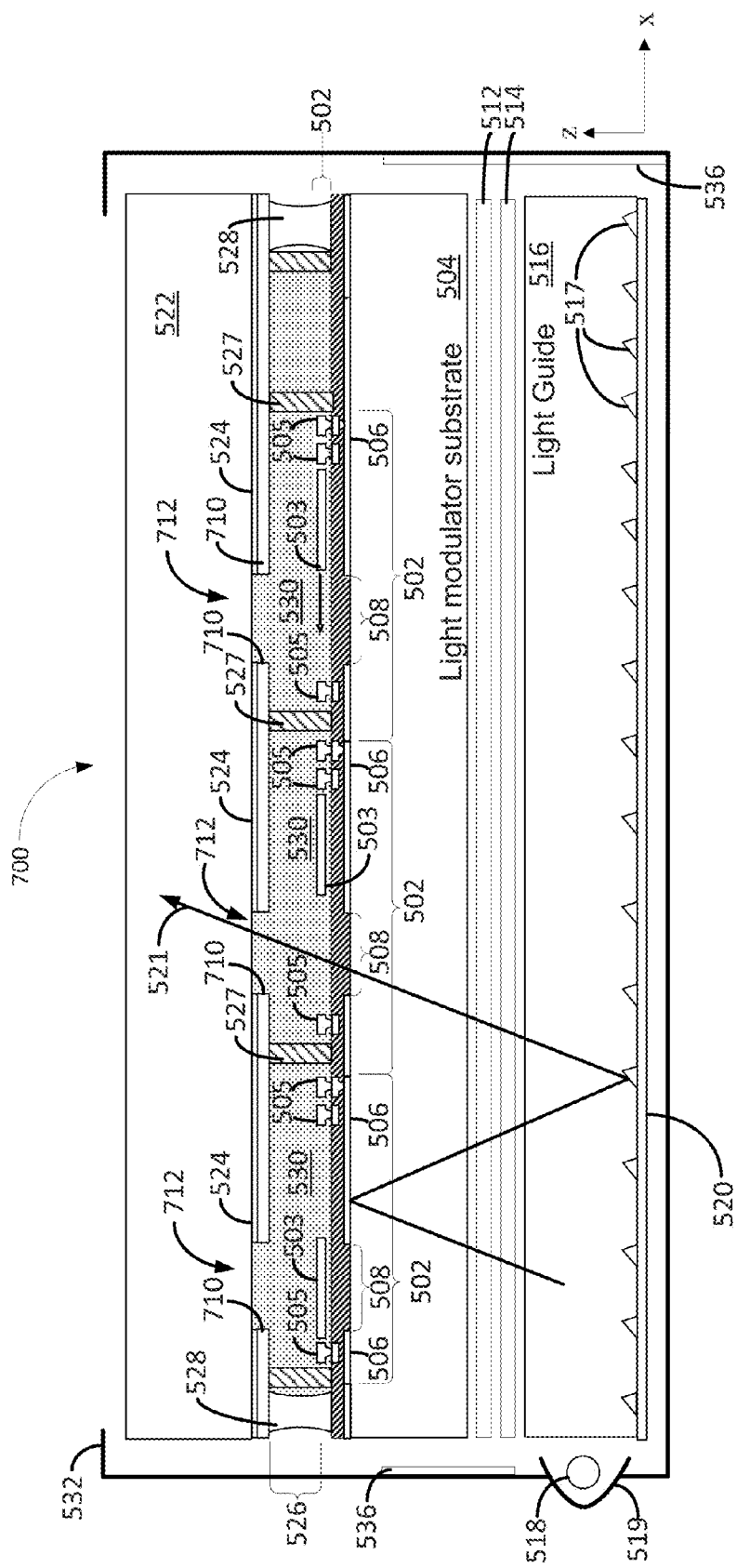
FIG. 7 shows an example cross sectional view of a display apparatus incorporating a light absorbing conductive layer.

FIG. 7 shows an example cross sectional view of a display apparatus incorporating a light absorbing conductive layer. The display apparatus 700 shares several elements in common with the MEMS-up display apparatus 500 of FIG. 5. Such common elements are referenced by the same numerals used in FIG. 5. The display apparatus 700, however, provides additional features that aid in mitigating the undesired effects of the charge buildup. Specifically, the display apparatus 700 includes a light absorbing electrically conductive layer 710 (hereinafter referred to as "the conductive layer 710") disposed on a side of the cover plate 522 that faces the light modulator substrate 504. Moreover, the conductive layer 710 is disposed such that one of its major surfaces is in electrical contact with the fluid 530. The conductive layer 710 can be formed from the deposition and/or anodization of a number of light absorbing conductive materials, including without limitation, molybdenum chromium (MoCr), molybdenum tungsten (MoW), molybdenum titanium (MoTi), molybdenum tantalum (MoTa), titanium tungsten (TiW), and titanium chromium (TiCr). Metal films formed from the above alloys or simple metals, such as nickel (Ni) and chromium (Cr) with rough surfaces also can be effective at absorbing light. Such films can be produced by sputter deposition in high gas pressures (sputtering atmospheres in excess of 20 mTorr). Rough metal films also can be formed by the liquid spray or plasma spray application of a dispersion of metal particles, following by a thermal sintering stage. The conductive layer 710 also can be formed using resin black matrix (RBM), which is light absorbing and sufficiently conductive.

As was discussed above with respect to FIG. 5, the electrostatic forces caused by the charge buildup on the cover plate 522 near the shutter 503 can undesirably affect the operation of the shutter 503. The inclusion of the conductive layer 710, however, mitigates this threat to device operability by dissipating the charge buildup in the vicinity of the conductive layer 710. By dissipating the charge buildup, the conductive layer 710 reduces or eliminates the electrostatic forces.

The conductive layer 710 can be configured in several ways to dissipate the charge buildup. In some implementations, the conductive layer 710 is electrically connected to a ground potential. This connection provides a path for charges to flow from the cover plate 522 to ground, preventing charge buildup.

In some other implementations, the states of the shutter assemblies are controlled by selectively applying activation voltages to the shutters instead of to the actuation drive beams. As a result, different shutters are frequently at different voltages. In such implementations, the conductive layer 710 is divided into regions, where each region corresponds to a single pixel. Each region is electrically connected to the shutter of its corresponding pixel, for example, via a conductive anchor associated with that pixel. Furthermore, individual regions of the conductive layer 710 are electrically isolated from each other. Thus, for each pixel, the corresponding region of the conductive layer 710 dissipates any charge buildup at the cover plate 522 adjacent that pixel. One example of a conductive layer with electrically isolated regions is described in further detail with reference to FIG. 11 below.

In some implementations, an electrically isolated region of the conductive layer 710 may correspond to a group of pixels. In such implementations, all the shutters of the group of pixels are operated at the same potential. Thus, the region of the conductive layer 710 that corresponds to the group of pixels is electrically connected to all the shutters of the group of pixels.

In some other implementations, all shutters 503 of all the pixels are operated at the same global potential during operation. In such implementations, the conductive layer 710 is electrically connected to all the shutters 503. In some implementations, the conductive layer 710 is electrically connected to the shutters 503 via the conductive spacers 527. In some other implementations, the edge seals 528 incorporate conductive materials such that the edge seals 528 can electrically connect the conductive layer 710 to interconnects that couple to the shutters 503. Maintaining the conductive layer 710 and the shutters 503 at the same potential reduces or eliminates charge buildup on the cover plate 522.

The conductive layer 710 of FIG. 7 is shown to extend only up to gaps 712 formed within the black matrix 524. Because the conductive layer 710 is not in the light path 521, it can be light absorptive to prevent stray light escaping towards the viewer, and thus, improve the display's contrast ratio.

In some instances, a charge buildup on the cover plate 522 in the gap 712 may exert electrostatic forces on the shutters 503 when in the shutter-closed position. As a result, the shutters 503 may get stuck in the closed position. To alleviate this risk, in some implementations, the conductive layer 710 includes conductive traces that extend into and across the gaps 712 such that the charge buildup in the gaps 712 also can be effectively dissipated.

In some implementations, the traces can be made of the same material as the conductive layer 710. As such, the traces would also be light absorbing and may absorb light rays 521 being emitted by the display apparatus 700. The obstruction of light can typically be reduced by making the traces as narrow (in the horizontal plane or in the plane of the conductive layer 710) as possible given the lithographic process used to pattern the conductive layer 710. In some implementations, the width of the traces and spacing between the traces are selected such that the traces do not obstruct more than around 10% of the gap 712. In some other implementations, where the conductivity of the traces is higher, the traces can be made even narrower so as to obstruct no more than around 5% or no more than about 1% of the gap 712.

Figure 8:
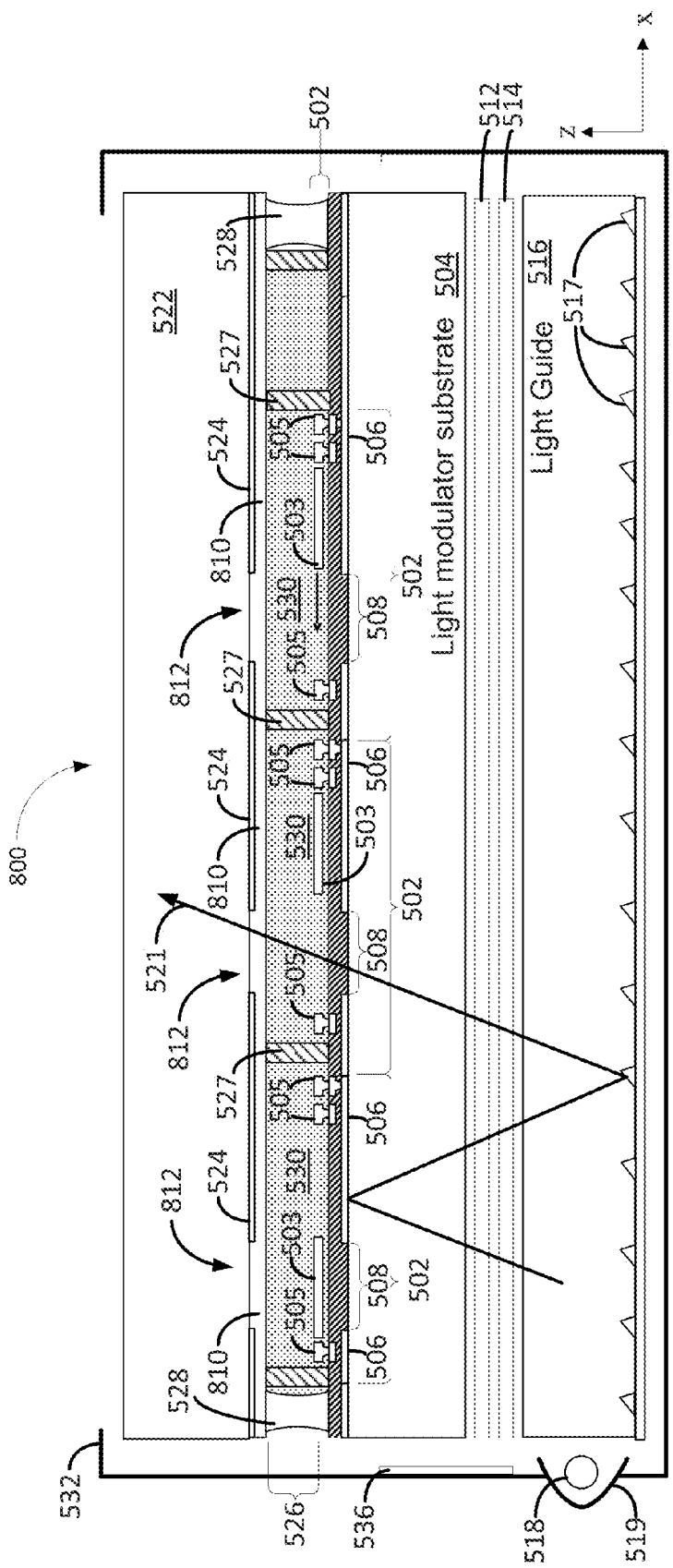
FIG. 8 shows an example cross sectional view of a display apparatus incorporating a transparent conductive layer.

FIG. 8 shows an example cross sectional view of a display apparatus incorporating a transparent conductive layer. The display apparatus 800 shares several elements in common with the MEMS-up display apparatus 500 of FIG. 5. Such common elements are referenced by the same numerals used in FIG. 5. The display apparatus 800 incorporates a transparent conductive layer 810. The transparent conductive layer 810 dissipates charge buildup near the cover plate 522 opposing the light modulator substrate 504. While the light absorbing layer 710 of FIG. 7 provided partial coverage in the gap 712 formed within the black matrix 524, the transparent conductive layer 810 provides coverage over the entire gap 812 formed by the black matrix 524. As a result, the charge buildup in the gap 812 can be effectively dissipated by the transparent conductive layer 810. Because it is transparent, the transparent conductive layer 810 does not substantially reduce the light output of the display apparatus 800.

The transparent conductive layer 810 can be employed to dissipate the charge buildup using various approaches. Similar to the approaches described above with respect to the conductive layer 710 (shown in FIG. 7), the transparent conductive layer 810 can be connected to ground potential or can be connected to a global interconnect that provides a common voltage to all of the shutters 503. In some implementations, the transparent conductive layer 810 can be divided into electrically isolated regions. Each region corresponds to and is electrically connected to one or more pixels.

In some implementations, the transparent conductive layer 810 can be a transparent conductive oxide (TCO) such as indium tin oxide (ITO), which is electrically conductive and is optically transparent to wavelengths in the visible spectrum. In some other implementations, other TCOs such as aluminum doped zinc oxide (AZO) and indium doped cadmium oxide also may be used.

Figure 9:
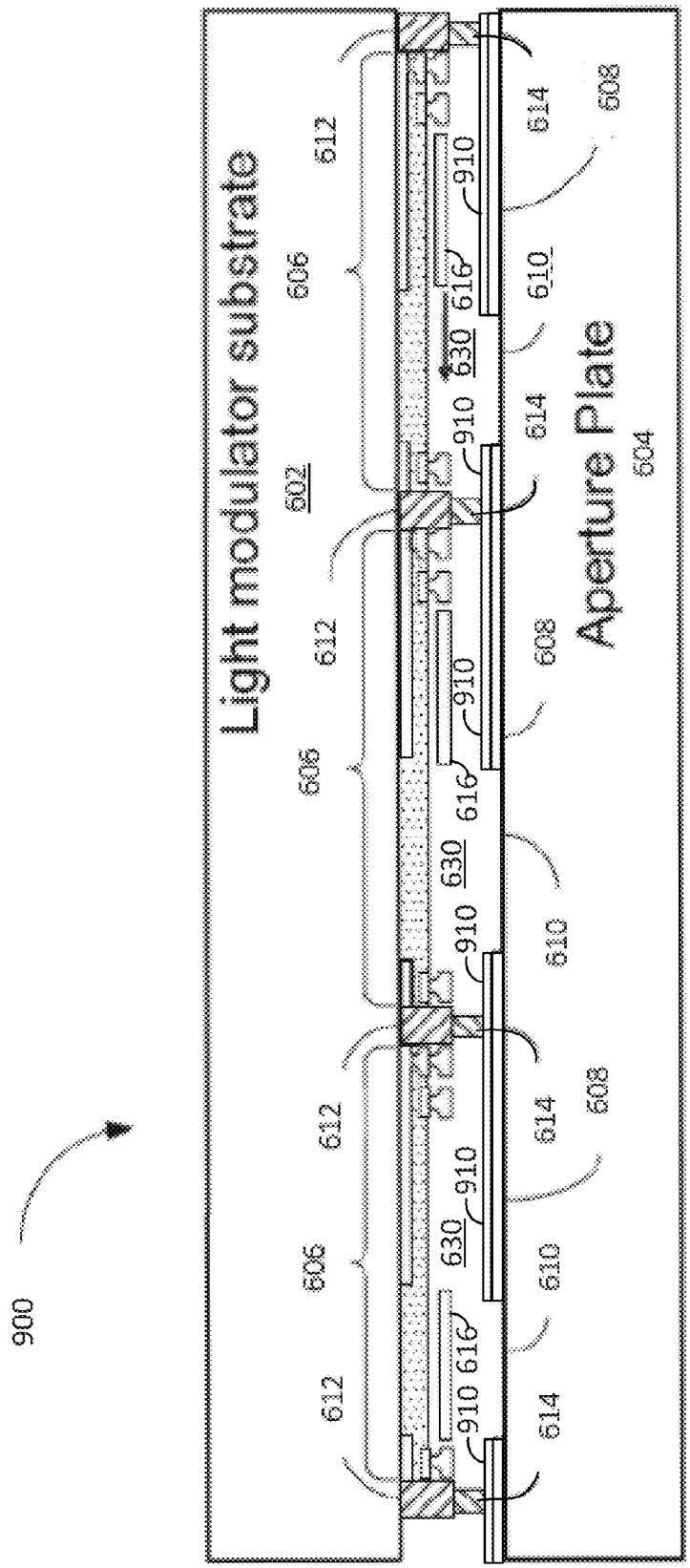
FIG. 9 shows an example cross section view of a light modulator substrate and an aperture plate for use in a MEMS-down configuration of a display apparatus having a light absorbing conductive layer.

FIG. 9 shows an example cross section view of a light modulator substrate and an aperture plate for use in a MEMS-down configuration of a display apparatus having a light absorbing conductive layer. The display apparatus 900 shares several elements in common with the MEMS-down display apparatus 600 of FIG. 6. Such common elements are referenced by the same numerals as in FIG. 6. The display apparatus 900, however, provides additional features that aid in mitigating the undesired effects of the charge buildup, which effects were discussed above with respect to FIG. 6. In particular, the display apparatus 900 includes a light absorbing electrically conductive layer 910 (hereinafter referred to as "the conductive layer 910") disposed on the aperture plate 604 that faces the modulator substrate 602. Specifically, the conductive layer 910 is deposited over the reflective aperture layer 608. Moreover, the conductive layer 910 is disposed such that one of its major surfaces is in electrical contact with the fluid 630. The conductive layer 910 can be formed from any of the materials and with any of the processes described in relation to FIG. 7 above for the formation of the conductive layer 710.

As was discussed above with respect to FIG. 6, the electrostatic forces caused by the charge buildup on the reflective aperture layer 608 can undesirably affect the operation of the shutters 616. The inclusion of the conductive layer 910, however, mitigates this risk to the operability of the shutters 616 by dissipating charge buildup in the vicinity of the conductive layer 910. By dissipating the charge buildup, the conductive layer 910 reduces or eliminates the electrostatic forces that are caused by the charge buildup.

In some instances, a charge buildup near the apertures 608, opposing the shutters 616, may generate electrostatic forces exerted on the shutter 616 when in the closed position. As a result of these electrostatic forces, there is a risk of the shutters 616 being rendered stuck in the closed position. To address this risk, in some implementations, the conductive layer 910 includes traces that extend into and across the apertures 610 such that the charge buildup in the apertures 608 also can be effectively dissipated.

Similar to the traces discussed above with respect to the MEMS-up configuration of FIG. 7 above, the traces of the conductive layer 910 also can constitute the same material as the conductive layer 710. Moreover, in some implementations, the width, and the spacing of the traces are selected such that the traces do not obstruct more than around 10% of the aperture 610. Furthermore, in some other implementations where the conductivity of the traces is higher, the traces can be made even narrower to as to obstruct no more than around 5% to no more than around 1% of the aperture 610.

The conductive layer 910 can be employed to dissipate the charge buildup using various approaches. Similar to the approaches described above with respect to the conductive layer 710, discussed in reference to FIG. 7, the conductive layer 910 can be connected to ground potential or can be connected to a global potential of all the shutters 616 via conductive spacers 612 and 608 or by a conductive edge seal. In some implementations, the conductive layer 910 can be divided into electrically isolated regions. In such implementations, each region corresponds to and is electrically connected to one or more pixels.

Figure 10:
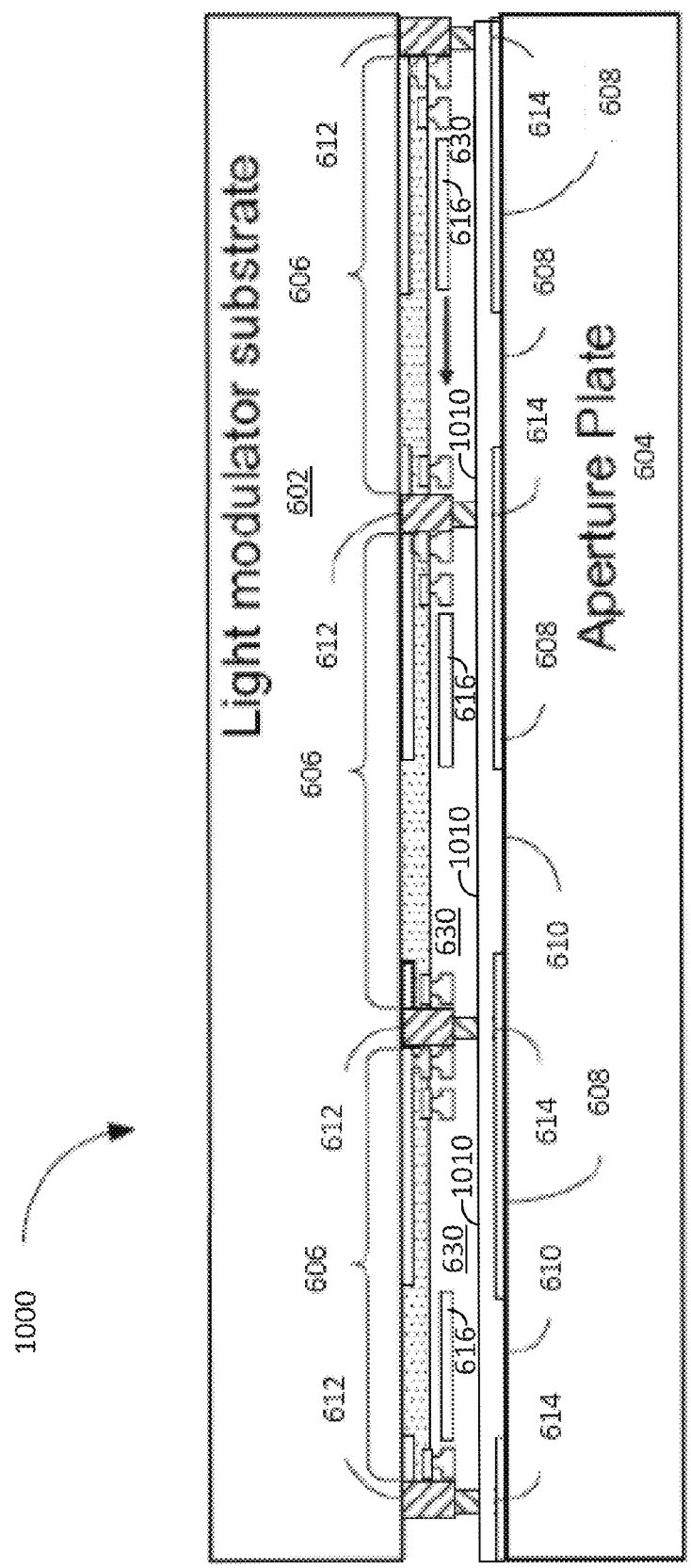
FIG. 10 shows an example cross section view of a light modulator substrate and an aperture plate for use in a MEMS-down configuration of a display apparatus having a transparent conductive layer.

FIG. 10 shows an example cross section view of a light modulator substrate and an aperture plate for use in a MEMS-down configuration of a display apparatus having a transparent conductive layer. In this example, a transparent conductive layer 1010 is disposed over the entirety of the reflective aperture layer 608 for dissipating a charge buildup near the reflective aperture layer 608. By extending over the apertures 610, the transparent conductive layer 1010 also dissipates the charge buildup in the apertures 610. As a result, electrostatic forces due to charge buildup in the apertures 610 are reduced or eliminated. Thus, the risk of these electrostatic forces causing the shutters 616 to be rendered stuck in the closed position is also reduced or eliminated.

Similar to the transparent conductive layer 810 of the MEMS-up configuration of FIG. 8 discussed above, the transparent conductive layer 1010 can be, in some implementations, a transparent conductive oxide (TCO) such as indium tin oxide (ITO), aluminum doped zinc oxide (AZO) or indium doped cadmium oxide.

The transparent conductive layer 1010 can be employed to dissipate the charge buildup using various approaches. Similar to the approaches described above with respect to the conductive layer 910 (shown in FIG. 9), the transparent conductive layer 1010 can be connected to ground potential or can be connected to a global potential of all the shutters 616. In some implementations, the conductive layer 1010 can be divided into electrically isolated regions. In such implementations, each region corresponds to and is electrically connected to one or more pixels.

Figure 11:
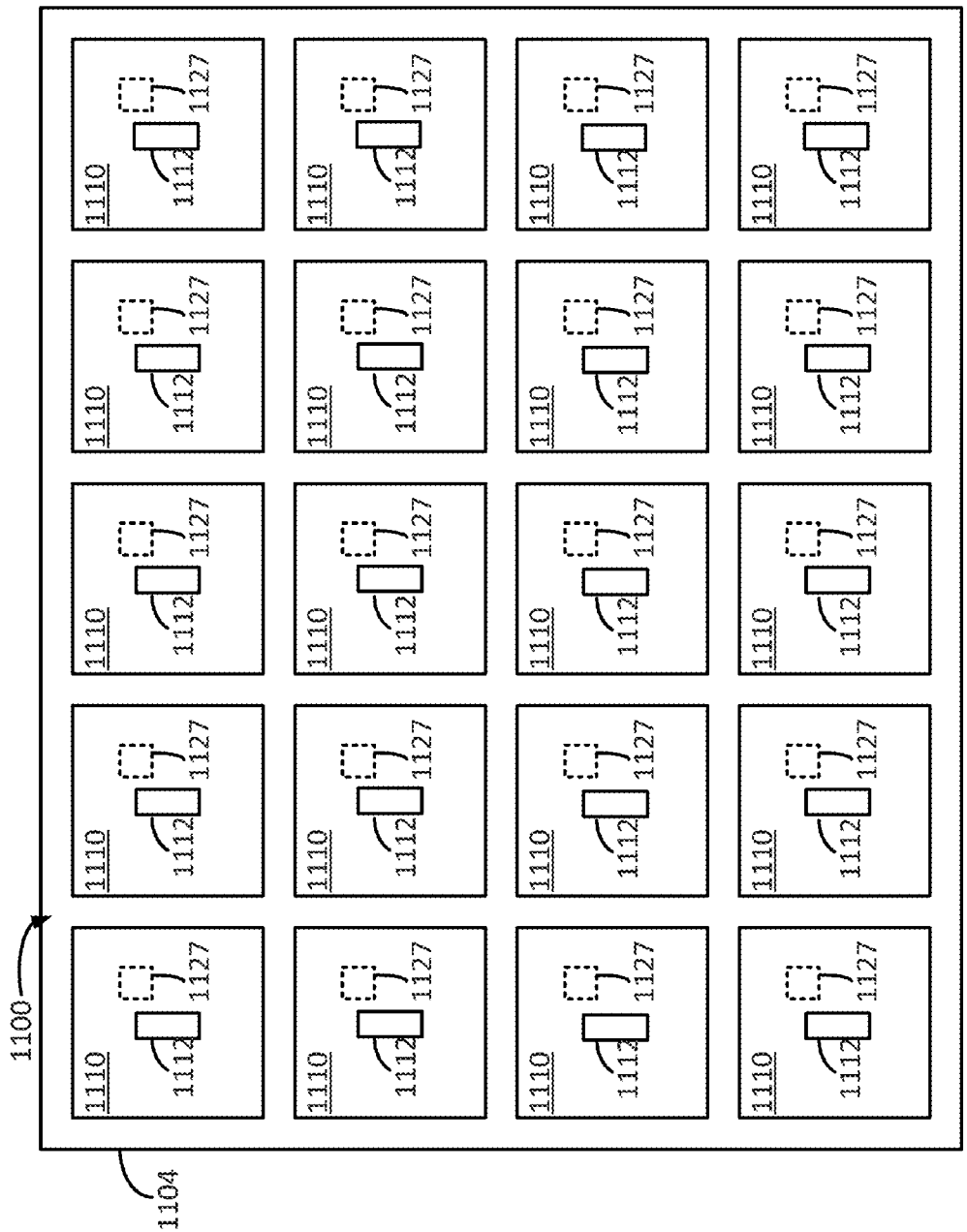
FIG. 11 shows an example top view of a light absorbing conductive layer.

FIG. 11 shows an example top view of a light absorbing conductive layer 1100. The light absorbing conductive layer 1100 is an example of a light absorbing layer suitable for use as the light absorbing conductive layers 710 and 910 depicted in FIGS. 7 and 9, respectively. In particular, the light absorbing conductive layer 1100 includes multiple electrically isolated conductive regions 1110 formed over an aperture layer or a substrate 1104. Suitable materials include any of the materials set forth for the light absorbing conductive layer 710 depicted in FIG. 7. Each region 1110 corresponds to a pixel. Each region is electrically isolated from all other regions. The conductive layer 1100 is formed by a light absorbing and electrically conductive material. Each region 1110 of the conductive layer 1100 can be formed from deposition and/or anodization of the light absorbing conductive material followed by any of the several micromachining techniques such as lithography, etching, etc., for defining an electrically isolated region 1110 for each pixel.

Each region 1110 of the conductive layer 1100 includes a gap or opening 1112, which corresponds to a gap or opening in a cover plate of the pixel or to an aperture in an aperture layer of the pixel. Each region 1110 also includes at least one location 1127, shown by way of dotted lines, where the conductive region 1110 makes contact with a conductive spacer, which, in turn, electrically connects the conductive region 1110 to the one or more shutters of the corresponding pixel.

In some implementations, one region 1110 of the conductive layer 1100 may correspond to more than one pixel. To that end, the conductive layer 1100 is micro machined such that one region 1110 of the conductive layer 1100 overlaps the more than one pixel. In some other implementations, the conductive layer 1100 may include only one region which covers all the pixels in the display apparatus. In such cases, the conductive layer 1100 is electrically connected to all the shutters of all the pixels via the conductive spacers at locations 1127 or via a conductive edge seal.

In some implementations, each region 1110 of the conductive layer 1100 may represent the conductive layer 710 of the MEMS-up configuration shown in FIG. 7. In such implementations, the gap 1112 can correspond to the opening 712 formed within the black matrix 524, the dotted lines can correspond to the location where the conductive layer 710 makes contact with the conductive spacer 527, and the substrate 1104 can correspond to the light modulator substrate 504 shown in FIG. 7. As discussed above with reference to FIG. 7, the opening 712 is aligned with the aperture 508 of the light modulator substrate 504. Furthermore, the electrically conductive spacers 527 connect the conductive layer 710 to the anchors 505, which, in turn, are electrically connected to the shutters 503. Thus, for each pixel, the corresponding region 710 is in electrical contact with the corresponding shutters 503 shown in FIG. 7.

In some other implementations, the regions 1110 shown in FIG. 11 correspond to the conductive layer 910 of the MEMS-down configuration discussed above with reference to FIG. 9. In such an implementation, the gaps 1112 would correspond to the apertures 610, the locations 1127 would correspond to locations where the conductive layer 910 makes contact with the conductive spacer 612, and the substrate 1104 would correspond to the reflective aperture layer 608 or the aperture plate 604, over which the conductive layer 910 is formed.

Figure 12:
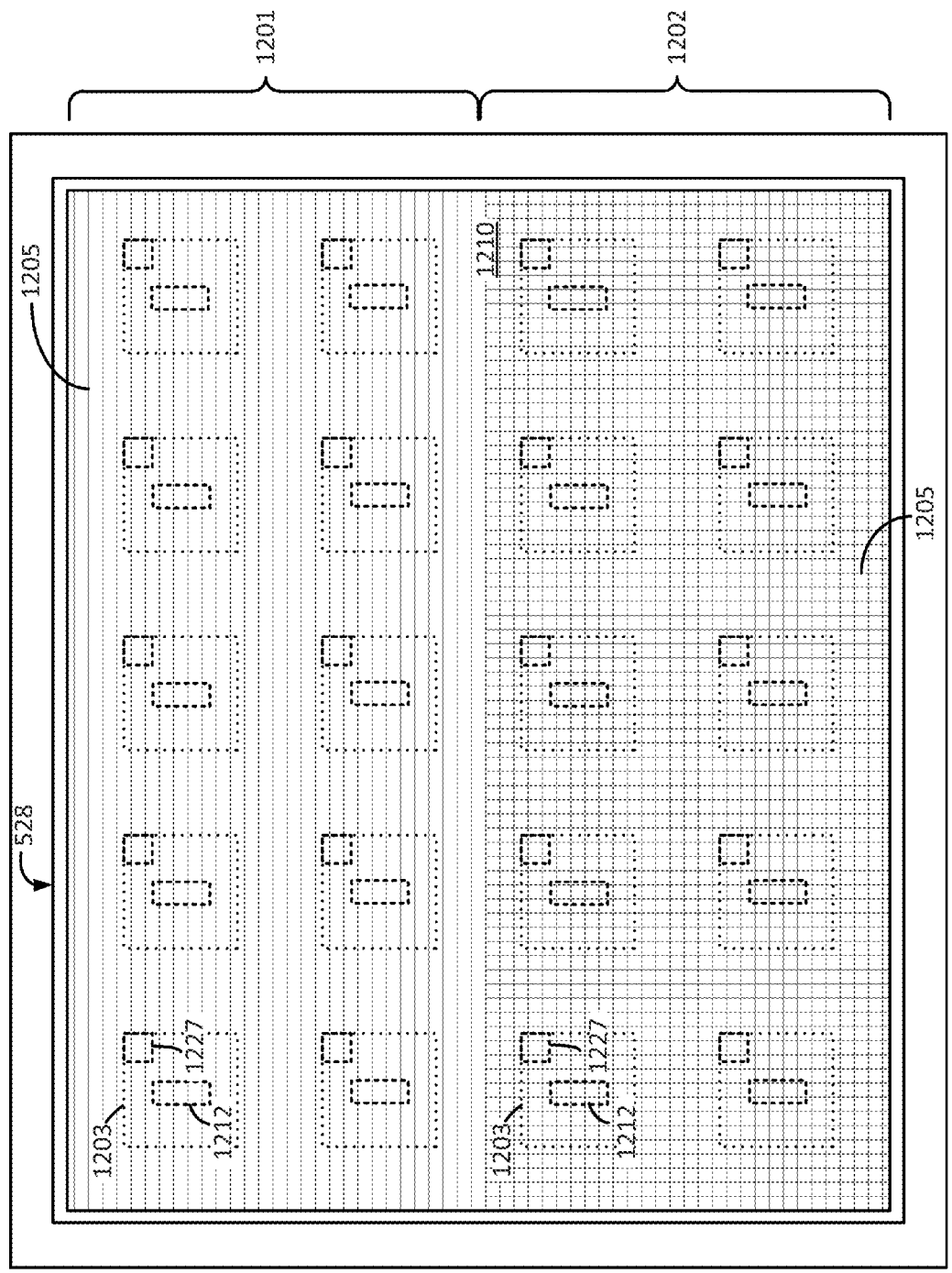
FIG. 12 shows an example top view of a layer of light absorbing conductive traces for use in a display apparatus.

FIG. 12 shows an example top view of a layer 1210 of light absorbing conductive traces for use in a display apparatus. The layer 1210 includes a number of conductive traces 1205 that run across the entire layer 1210. In one illustrative region 1201, the conductive traces 1205 are oriented in the same direction, while in another illustrative region 1202, the conductive traces are oriented in more than one direction. The two regions are depicted for illustrative purposes. While some implementations may include multiple trace regions, where the traces have different patterns in the different regions, in some other implementations, the entire layer 1210 may include conductive traces 1205 having a uniform pattern and orientation.

FIG. 12 also shows underlying pixel regions 1203 by way of dotted lines. Each pixel region 1203 includes an opening 1212 and a contact location 1227. The opening 1212 can correspond to a gap or opening in a cover plate associated with the pixel or to an aperture in an aperture layer associated with the pixel. Each contact location 1227 corresponds to the locations where the conductive traces 1205 make contact with a conductive spacer of the underlying pixel. The layer 1210 is also electrically connected to a conductive edge seal, such as the edge seal 528 depicted in FIGS. 5 and 7. The conductive edge seal can electrically connect each of the conductive traces 1205 to each other, and to the shutters of one or more underlying pixel regions.

In some implementations, the width and spacing between the conductive traces 1205 is selected such that the traces do not obstruct more than around 10% of each gap 1212. In some other implementations, where the conductivity of the traces is higher, the traces can be made even narrower so as to obstruct no more than around 5% or no more than about 1% of each gap 1212.

In some implementations, the conductive layer 1210 of FIG. 12 having conductive traces 1205 can serve as the conductive layer 710 of the MEMS-up configuration shown in FIG. 7. In such implementations, the pixel regions 1203 corresponds to the individual display elements of the display apparatus 700, the gaps or openings 1212 correspond to the gaps or openings 712 formed within the black matrix 524 on the cover plate 522, and the contact locations 1227 correspond to the locations where the conductive layer 710 makes contact with the conductive traces 527, which electrically connect the conductive layer 710 to the shutters 503.

Similarly, in some other implementations, the conductive layer 1210 of FIG. 12 having conductive traces 1205 can serve as the conductive layer 910 of the MEMS-down configuration shown in FIG. 9. In such implementations, the pixel regions 1203 correspond to the individual display elements of the display apparatus 900, the gaps or openings 1212 correspond to the apertures 610, and the contact locations 1227 correspond to locations where the conductive layer 910 makes contact with the conductive spacer 612, which electrically connects the conductive layer 910 to shutters 616.

In some other implementations, the conductive layer 1210 can be divided into regions similar to the regions 1110 of the conductive layer 1100 of FIG. 11. In such implementations, the conductive traces 1205 may be isolated within the regions 1203 representing underlying pixel regions.

Figure 13:
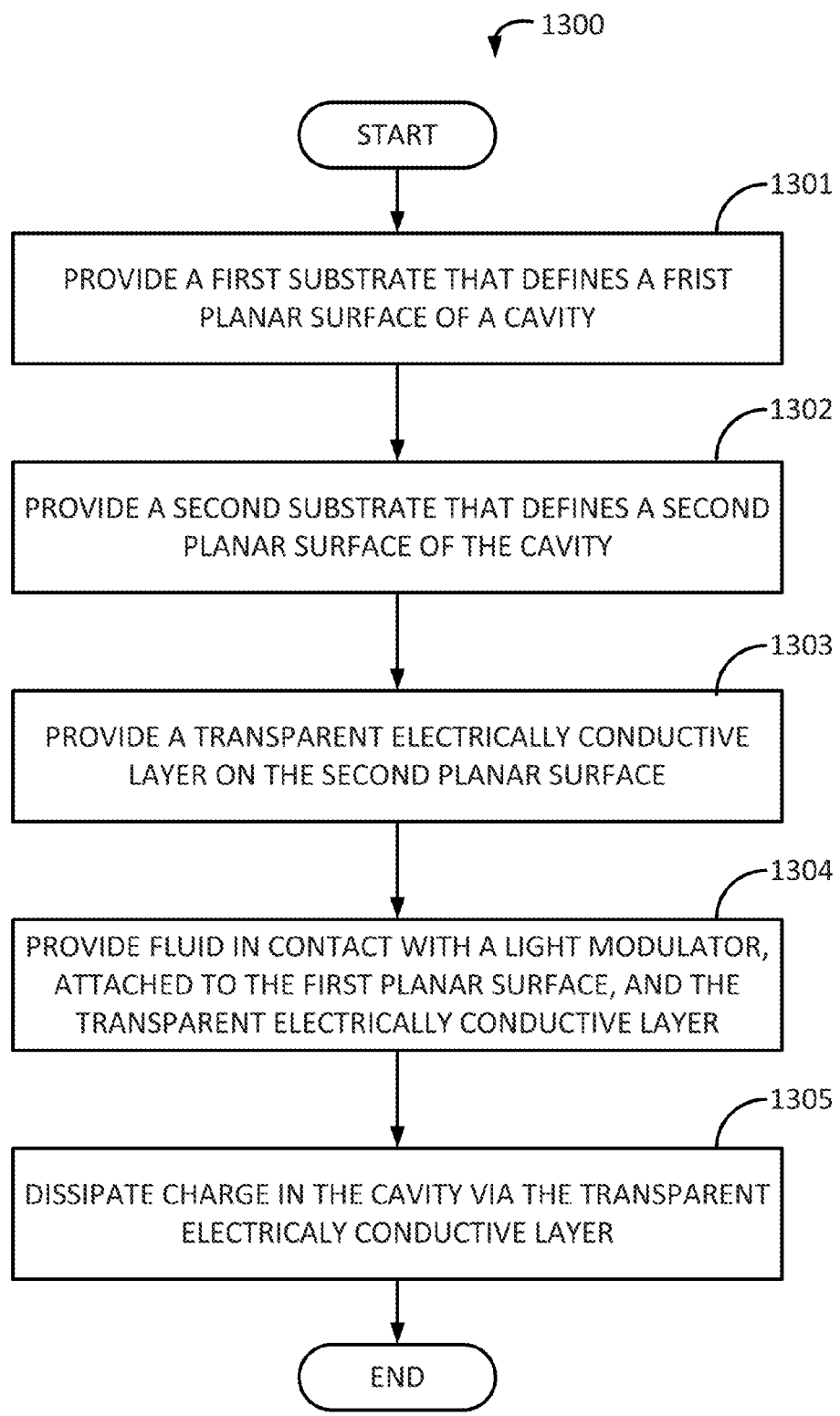
FIG. 13 shows a example flow diagram of a method for reducing charge buildup within a cavity of a display apparatus.

FIG. 13 shows a example flow diagram of a method 1300 for reducing charge buildup within a cavity of a display apparatus. The method 1300 is described herein with reference to the packaging of the MEMS-up configuration of display apparatus 800 of FIG. 8 as an example. However, it is understood that the method 1300 also may be applied to the packaging of other display apparatus configurations, such as those shown in FIGS. 7 and 9-12.

The method begins with providing a first substrate that defines a first planar surface of a cavity (stage 1301). With reference to FIG. 8, the first substrate can be the light modulator substrate 504, which defines the first planar surface of a cavity. The light modulator substrate 504 provides a surface on which the shutter assemblies 502, and the spacers 527 are disposed.

Subsequently, a second substrate that defines a second planar surface of the cavity is provided (stage 1302). The second planar surface is disposed opposite the first planar surface. With reference to FIG. 8, the second planar surface can be the cover plate 522. Then, a transparent electrically conductive layer on the second planar surface is provided (stage 1303). With reference to FIG. 8, the transparent electrically conductive layer can be the transparent conductive layer 810 disposed on the cover plate 522. As described above in relation to FIG. 7, the electrically conductive layer can be deposited on the second substrate by deposition and/or anodization of a number of light absorbing conductive materials set forth above.

After providing the transparent conductive layer over the second planar surface, a fluid, in contact with a light modulator attached to the first planar surface and a major surface of the electrically conductive layer is provided (stage 1304). With reference to FIG. 8, the fluid provided in stage 1304 can be the fluid 530, and the light modulator can be the shutter 503, which is attached to the light modulator substrate 504. Thus, the fluid 530 is in contact with the shutter 503 and the transparent electrically conductive layer 810.

Finally, a portion of the charge within the cavity is dissipated via the conductive layer (stage 1305). Referring again to FIG. 8, the conductive layer 810 dissipates the charge buildup near the cover plate 522. The dissipation of charge can occur during the filling of the fluid into the cavity, or during normal operation of the display apparatus 800. During the filling of the fluid, charge buildup can occur due to friction between the fluid in motion and various surfaces of the display apparatus 800. In such instances, a common electrical potential can be applied both to the conductive layer and to the light modulators before and during the filling of such fluid. While the cavity formed between the two substrates is being filled, the common potential of the light modulators and the conductive layer provide for the dissipation of the charge buildup resulting from the fluid filling process. After the filling is complete, in some implementations, the common potential is removed.

In some other implementations, the fluid can be filled before the application of the common electrical potential to the conductive layer and the light modulators.

In some other implementations, charge buildup can occur during operation due to friction between the shutters 503 and the fluid 530, due to charge migration from various charged surfaces in the display apparatus 800, or for other reasons. In such implementations, the charge buildup can be dissipated by electrically connecting the conductive layer with the shutters 503 through any of the approaches described above with respect to FIGS. 7-12.

As described above, a conductive layer in a display can be configured in several ways to dissipate charge buildup. In some of these ways, charge dissipation is achieved by electrically coupling the conductive layer to shutters, such as the shutters 503, via conductive spacers, such as the conductive spacers 527, each depicted in FIG. 7. In order to maintain the conductive layer and the shutters at a common potential, the electrical connection between the shutters and the conductive layer is maintained during operation in a variety of operating environments.

However, ambient temperature changes or pressure changes can lead to the formation of bubbles in the display. To prevent bubbles from forming, one or more of the substrates of the display may be configured to deform. In implementations in which the spacers do not serve to electrically connect the conductive layer to a corresponding shutter, for example, when an edge seal is relied upon for such a connection, a gap can be left between the spacers and the conductive layer, allowing room for substrate deformation. However, in implementations employing conductive spacers, such a gap would sever the electrical connection provided by the spacers. Accordingly, an alternative configuration is desirable that permits substrate deformation while maintaining the electrical connections provided by conductive spacers described in relation to FIG. 7. One such configuration is shown in FIGS. 14A-14C.

Figure 14A:
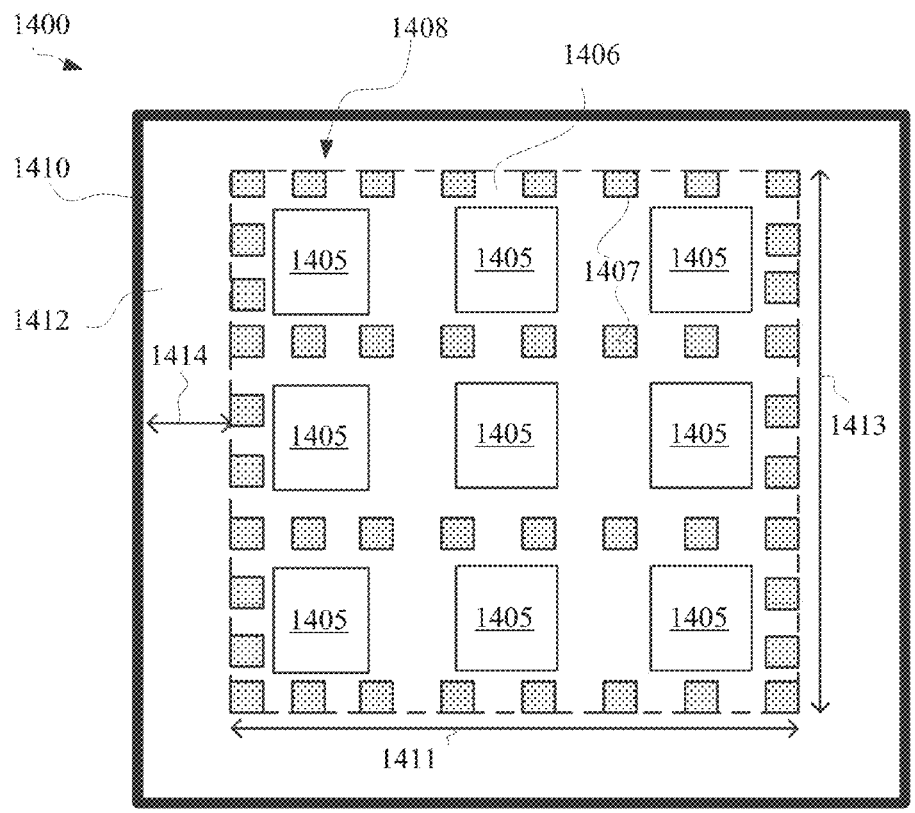
FIG. 14A shows a top view of an example display with an expanded spacer-free region.
Figure 14B:
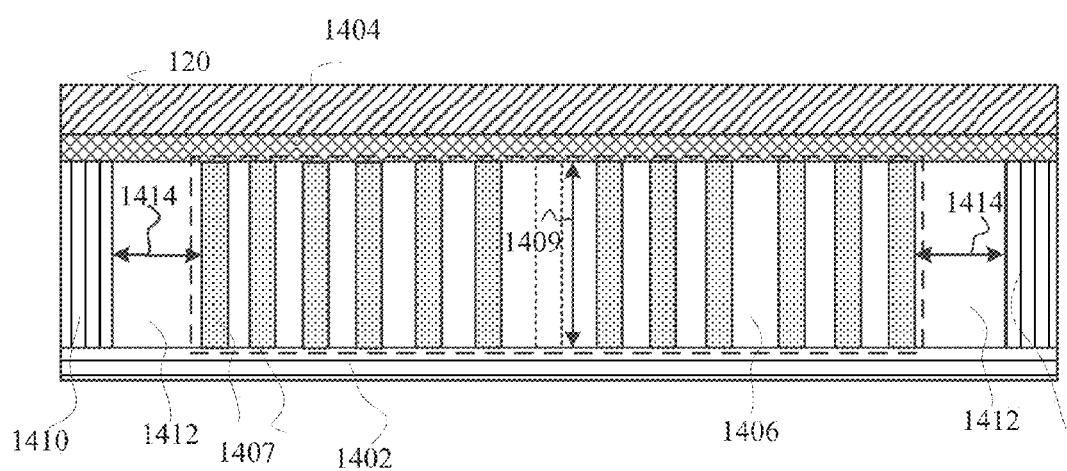
FIG. 14B shows a side view of the display shown in FIG. 14A.
Figure 14C:
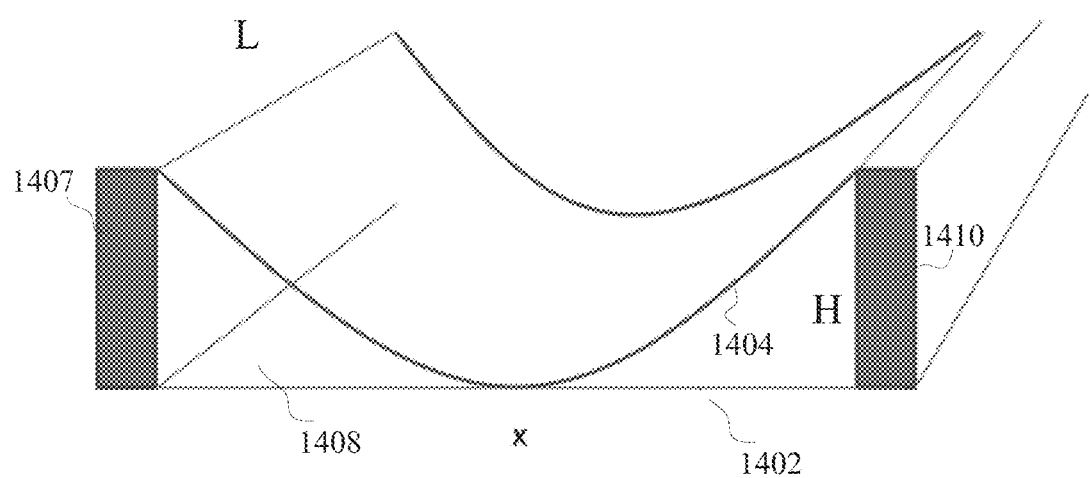
FIG. 14C shows a perspective view of the expanded spacer-free region of the display shown in FIG. 14A.

FIG. 14A shows a top view of an example display 1400 with an expanded spacer-free region about its perimeter. FIG. 14B shows a side view of the display shown in FIG. 14A. Referring now to FIGS. 14A and 14B, the display 1400 includes a first substrate 1402 supporting an array of display elements 1405 and a second substrate 1404 separated from the first substrate 1402 by a cell gap 1409. The area between the first substrate 1402 and the second substrate 1404 is referred to as the cell. At least one of the first substrate 1402 and the second substrate 1404 is flexible. The display 1400 includes a display region 1406 used to form an image. The display region 1406 has a width 1411 and a length 1413.

The first and second substrate are separated by conductive spacers 1407. The conductive spacers 1407 are positioned within the display region 1406 and electrically connect the display elements 1405 on the first substrate 1402 to a conductive surface on the second substrate 1404. The first substrate 1402 and the second substrate 1404 are joined together by an edge seal 1410, such as a polymer sealant, along a perimeter of the display region 1406. Examples of suitable sealants include epoxy resins that can be thermally cured or cured by ultraviolet light. Other suitable sealants can include adhesives that can be used for curing after the substrates are aligned while preventing moisture from entering into the cell.

Between the display region 1406 and the edge seal 1410, the display 1400 includes a substantially spacer-free region 1408 within which one of the first substrate 1402 and second substrate 1404 (the "deforming substrate") can deform towards the other, without such deformation being limited by the spacers 1407. The spacer-free region 1408 is large enough to allow the deforming substrate to deform sufficiently to prevent bubble formation within an operating temperature range of the display 1400. In some implementations, the spacer-free region has a width on the order of about 1-20 millimeters. In some implementations, the operating temperature range of the display 1400 is above about 0° C. In some other implementations, the operating range of the display is above about −30° C.

FIG. 14C shows a perspective view of the expanded spacer-free region of the display shown in FIG. 14A. In particular, FIG. 14C shows a perspective view of the spacer-free region when fully collapsed. Referring now to FIGS. 14A-14C, the spacer-free region 1408 is bounded on one side by the edge seal 1410 and the outermost spacer 1407 in the display region. To prevent a user from seeing the deformation of the deforming substrate when the display is assembled into a host device, the host device includes a bezel that substantially covers the spacer-free region 1408 such that only the display region is visible.

The width of the spacer-free region 1408 is at least as wide as needed such that the volume reduction resulting from the full collapse of the deforming substrate within the region (i.e., the point at which the first and second substrates 1402 and 1404 make contact) fully offsets the volume reduction of the fluid effected by the temperature dropping to the lowest temperature within the display's range of operating temperatures. For example, if the operating range of the display 1400 is greater than about −30° C., then the width 1414 of the spacer-free region 1408 is at least large enough that the deforming substrate can deform enough to compensate for the reduction in volume of the fluid in the display resulting from the display 1400 operating in an environment in which the ambient temperature is about −30° C. This width 1414 can be calculated based on the thickness of the substrate that will deform, its modulus, the total area of the display region 1406, and the coefficient of thermal expansion (CTE) of the fluid. In some implementations, the CTE of the fluid dictates the volume reduction that will need to be accommodated as a result of a temperature drop. In some implementations, the width 1414 of the spacer-free region 1408 can be calculated based on the corresponding width 1411 of the display region 1406. In some implementations, the width of the spacer-free region is calculated using the following equation and solving for x:

$$CV=(L \cdot x \cdot H)+((W-2x)(H))$$

where

CV is the calculated volume reduction of the fluid;

L is the length of the display region 1406 and the spacer-free region 1408;

H is the cell gap between the first substrate 1402 and the second substrate 1404;

W is the width of the display region 1406 and the spacer-free region 1408; and x is the minimum width of the spacer-free region 1408.

This equation assumes that the volume reduction of one side of the spacer-free region 1408 is equal to half of the product of the length of the display region 1406 and the spacer-free region 1408, the height of the cell gap 1409 and the minimum width of the spacer-free region 1408 ((x·L·H)/2).

Figure 15A:
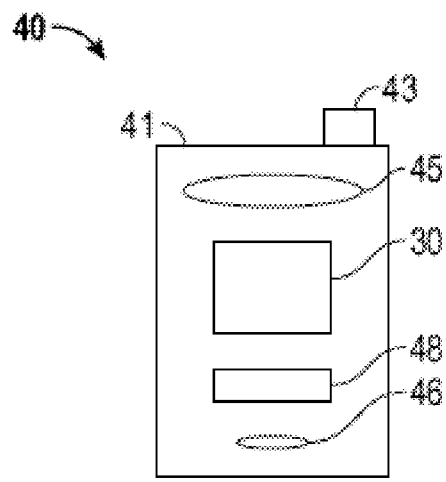
FIGS. 15A and 15B are system block diagrams illustrating a display device that includes a plurality of display elements.
Figure 15B:
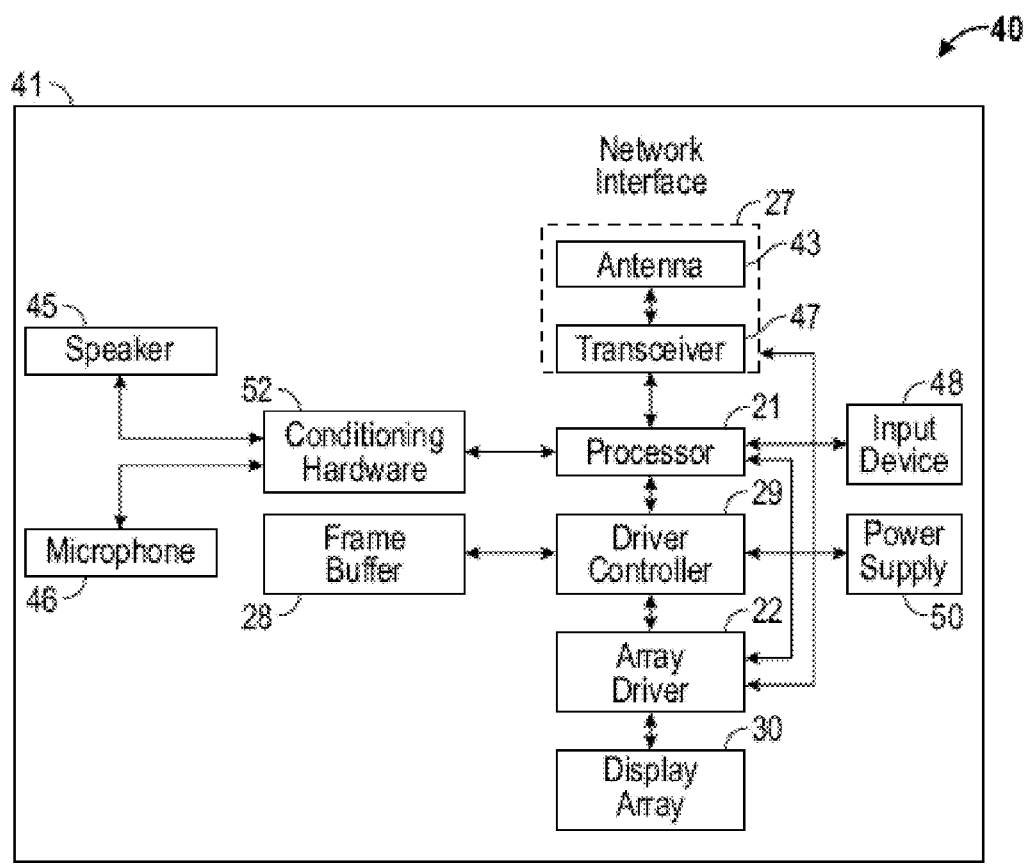

FIGS. 15A and 15B are system block diagrams illustrating a display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 15A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 15A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HS-DPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
a first substrate defining a first planar surface of a cavity;
a second substrate defining a second planar surface of the cavity opposite from the first planar surface;
at least one light modulator, attached to the first planar surface and disposed within the cavity, capable of moving between at least first and second positions within the cavity in a plane that is substantially parallel to the first planar surface;
a fluid, disposed in the cavity, in which the light modulator is immersed; and
a transparent electrically conductive layer, disposed on the second planar surface, in contact with the fluid,
wherein the at least one light modulator and the transparent electrically conductive layer are at substantially the same electrical potential.

2. The apparatus of claim 1, wherein a major surface of the transparent electrically conductive layer is in contact with the fluid.

3. The apparatus of claim 1, wherein the at least one light modulator comprises a shutter capable of transmitting or reflecting light out of the cavity in one of the first and second positions and of preventing light from propagating out of the cavity in the other of the first and second positions.

4. The apparatus of claim 1, wherein the at least one light modulator is further capable of moving into at least a third position within the cavity.

5. The apparatus of claim 1, further comprising:
a conductive spacer, disposed within the cavity, in electrical communication with the light modulator and the transparent electrically conductive layer.

6. The apparatus of claim 5, further comprising:
a display region surrounding the conductive spacer and the at least one light modulator;
a plurality of additional conductive spacers positioned within the display region; an edge seal surrounding the display region coupling the first substrate to the second substrate;
a spacer-free region positioned between the edge seal and the display region such that the plurality of spacers substantially prevents the first and second substrates from deforming within the display region and at least one of the first and second substrates is free to deform within the spacer-free region.

7. The apparatus of claim 1, wherein the at least one light modulator and the transparent electrically conductive layer are at ground potential.

8. The apparatus of claim 1, wherein the at least one light modulator comprises at least part of at least one pixel, the at least one pixel defining at least part of a display viewing area.

9. The apparatus of claim 1, wherein the at least one pixel further comprises at least one aperture defined by the first substrate or the second substrate, and wherein the transparent electrically conductive layer extends over at least 20% of the at least one aperture.

10. The apparatus of claim 1, wherein the transparent electrically conductive layer comprises indium tin oxide (ITO).

11. The apparatus of claim 1, further comprising:
a display including:
the first substrate, the second substrate, the at least one light modulator, the fluid, the transparent electrically conductive layer;
a processor capable of communicating with the display, the processor being capable of processing image data; and
a memory device capable of communicating with the processor.

12. The apparatus of claim 11, further comprising:
a driver circuit capable of sending at least one signal to the display; and
a controller capable of sending at least a portion of the image data to the driver circuit.

13. The apparatus of claim 11, further comprising:
an image source module capable of sending the image data to the processor, wherein the image source module comprises at least one of a receiver, transceiver, and transmitter.

14. The apparatus of claim 11, further comprising:
an input device capable of receiving input data and communicating the input data to the processor.

15. An apparatus comprising:
a first substrate defining a first planar surface of a cavity;
a second substrate defining a second planar surface of the cavity opposite from the first planar surface;
at least one light modulator, attached to the first planar surface and disposed within the cavity, capable of moving between at least first and second positions within the cavity;
a fluid, disposed in the cavity, in which the light modulator is immersed; and
a light-absorbing electrically conductive layer, disposed on the second planar surface, in contact with the fluid,
wherein the at least one light modulator and the light-absorbing electrically conductive layer are at substantially the same electrical potential.

16. The apparatus of claim 15, wherein a major surface of the light absorbing electrically conductive layer is in contact with the fluid.

17. The apparatus of claim 15, wherein the at least one light modulator comprises a shutter capable of transmitting or reflecting light out of the cavity in one of the first and second positions and of preventing light from propagating out of the cavity in the other of the first and second positions.

18. The apparatus of claim 15, wherein the at least one light modulator is further capable of moving into at least a third position within the cavity.

19. The apparatus of claim 15, further comprising:
a conductive spacer, disposed within the cavity, in electrical communication with the light modulator and the light-absorbing electrically conductive layer.

20. The apparatus of claim 19, further comprising:
a display region surrounding the conductive spacer and the at least one light modulator; a plurality of additional conductive spacers positioned within the display region; an edge seal surrounding the display region coupling the first substrate to the second substrate;
a spacer-free region positioned between the edge seal and the display region such that the plurality of spacers substantially prevents the first and second substrates from deforming within the display region and at least one of the first and second substrates is free to deform within the spacer-free region.

21. The apparatus of claim 15, wherein the at least one light modulator and the light-absorbing electrically conductive layer are at ground potential.

22. The apparatus of claim 15, wherein the at least one light modulator comprises at least part of at least one pixel, the at least one pixel defining at least part of a display viewing area.

23. The apparatus of claim 15, wherein the at least one pixel further comprises at least one aperture defined by the first substrate or the second substrate, and wherein the light-absorbing electrically conductive layer extends over part of the at least one aperture.

24. A method of reducing electrostatic attraction between a light modulator attached to a first planar surface of a cavity and a second planar surface of the cavity opposite the first planar surface, comprising:
providing a first substrate that defines the first planar surface of the cavity;
providing a second substrate that defines the second planar surface of the cavity opposite the first planar surface;
providing a transparent electrically conductive layer disposed on the second planar surface of the cavity;
providing a mechanism for moving the light modulator between at least first and second positions within the cavity in a plane that is substantially parallel to the first planar surface;
providing a fluid in contact with the light modulator and the transparent electrically conductive layer;
applying a first electrical potential to the light modulator;
applying a second electrical potential to the transparent electrically conductive layer, wherein the first and second electrical potentials are substantially the same; and
dissipating charge in the cavity via the transparent electrically conductive layer.

25. The method of claim 24, wherein the fluid is in contact with a major surface of the transparent electrically conductive layer.

26. The method of claim 24, wherein the acts of applying the first electrical potential and applying the second electrical potential are carried out before immersing the light modulator in the fluid.

27. The method of claim 24, further comprising:
immersing the light modulator in the fluid before applying the first and second electrical potentials;
removing the first and second electrical potentials after immersing the light modulator in the fluid; and
sealing the cavity.

* * * * *